US012793882B2

(12) United States Patent
Kashiwai

(10) Patent No.: US 12,793,882 B2
(45) Date of Patent: Nov. 10, 2026

(54) MULTILAYER COIL COMPONENT

(71) Applicant: Murata Manufacturing Co., Ltd., Kyoto-fu (JP)

(72) Inventor: Yusuke Kashiwai, Nagaokakyo (JP)

(73) Assignee: Murata Manufacturing Co., Ltd., Kyoto-fu (JP)

(*) Notice: Subject to any disclaimer, the term of this patent is extended or adjusted under 35 U.S.C. 154(b) by 591 days.

(21) Appl. No.: 18/365,881

(22) Filed: Aug. 4, 2023

(65) Prior Publication Data

US 2024/0071680 A1 Feb. 29, 2024

(30) Foreign Application Priority Data

Aug. 31, 2022 (JP) ................................ 2022-138200

(51) Int. Cl.
*H01F 27/28* (2006.01)
*H01F 27/29* (2006.01)

(52) U.S. Cl.
CPC ....... *H01F 27/2804* (2013.01); *H01F 27/292* (2013.01); *H01F 2027/2809* (2013.01)

(58) Field of Classification Search
CPC ............... H01F 27/2804; H01F 27/292; H01F 2027/2809; H01F 17/0013; H01F 27/06; H01F 2027/065
See application file for complete search history.

(56) References Cited

U.S. PATENT DOCUMENTS

2012/0326827 A1* 12/2012 Nanjyo ............... H01F 17/0033 336/200
2016/0189851 A1* 6/2016 Lee ..................... H01F 27/2804 174/260
2018/0019052 A1* 1/2018 Hashimoto ........... H01F 41/046
2019/0172627 A1* 6/2019 Oishi .................. H01F 17/0013
2020/0251273 A1* 8/2020 Takai .................... H01F 27/292
2021/0202161 A1* 7/2021 Takai .................. H01F 17/0013
2021/0249178 A1* 8/2021 Imada ................. H01F 27/2804
2021/0265100 A1* 8/2021 Oishi .................. H01F 17/0013
2021/0327635 A1* 10/2021 Oishi ...................... H01F 27/24
2022/0189674 A1* 6/2022 Suzuki ................ H01F 17/0013
2023/0162899 A1* 5/2023 Imada ................. H01F 27/2847 336/199
2024/0304367 A1* 9/2024 Yamamoto ................ H01F 5/04
2024/0428975 A1* 12/2024 Hiraki ................. H01F 17/0013

FOREIGN PATENT DOCUMENTS

JP H11-219821 A 8/1999

* cited by examiner

*Primary Examiner* — Mang Tin Bik Lian
(74) *Attorney, Agent, or Firm* — Studebaker Brackett PLLC

(57) ABSTRACT

A multilayer coil component includes a base body, plural conductive layers, and plural outer electrodes. The base body include plural insulating layers stacked on each other in a stacking direction. The plural conductive layers are disposed inside the base body and are stacked on each other in the stacking direction together with the plural insulating layers. The plural outer electrodes are each disposed on a surface of the base body. The base body has first and second main surfaces opposing each other in the stacking direction. At least some of the plural conductive layers are electrically connected to each other so as to form a coil which is electrically connected to the plural outer electrodes. The plural conductive layers include first and second outer conductive layers and at least one inner conductive layer.

23 Claims, 11 Drawing Sheets

MULTILAYER COIL COMPONENT

CROSS-REFERENCE TO RELATED APPLICATION

This application claims benefit of priority to Japanese Patent Application No. 2022-138200, filed Aug. 31, 2022, the entire content of which is incorporated herein by reference.

BACKGROUND

Technical Field

The present disclosure relates to a multilayer coil component.

Background Art

Japanese Unexamined Patent Application Publication No. H11-219821 discloses the following multilayer inductor. The multilayer inductor is formed by firing a multilayer body constituted by a magnetic paste layer and a conductive paste layer stacked on each other. The magnetic paste layer is obtained by mixing a binder into magnetic powder. The multilayer inductor has a void portion between a magnetic layer and a conductive layer which forms an inner coil.

SUMMARY

In the multilayer inductor disclosed in the above-described publication, a void portion is provided between the magnetic layer and the conductive layer in the stacking direction of the layers. Because of this void portion, a stress in the conductive layer does not influence the magnetic layer. That is, the stress relaxation effect is achieved. However, after a study of this multilayer inductor, the present inventor has found that, when the multilayer inductor is mounted on a subject device, such as a substrate, because of an impact load applied to the multilayer inductor in the stacking direction, the magnetic layer may crack starting from the void portion, which is provided between the magnetic layer and the conductive layer located at the outermost position in the stacking direction and which overlaps an outer electrode in the stacking direction.

The present disclosure has been made to address the above-described issue. Accordingly, the disclosure provides a multilayer coil component which is able to reduce the occurrence of cracks in an insulating layer at the time of the mounting of the multilayer coil component while relaxing a stress inside a base body.

A multilayer coil component according to an aspect of the disclosure includes a base body, plural conductive layers, and plural outer electrodes. The base body is constituted by plural insulating layers stacked on each other in a stacking direction. The plural conductive layers are disposed inside the base body and are stacked on each other in the stacking direction together with the plural insulating layers. The plural outer electrodes are each disposed on a surface of the base body. The base body has first and second main surfaces opposing each other in the stacking direction. At least some of the plural conductive layers are electrically connected to each other so as to form a coil which is electrically connected to the plural outer electrodes. The plural conductive layers include first and second outer conductive layers and at least one inner conductive layer. The first outer conductive layer is disposed at an outermost position of the base body in the stacking direction on a side of the first main surface. The second outer conductive layer is disposed at an outermost position of the base body in the stacking direction on a side of the second main surface. The at least one inner conductive layer is disposed between the first outer conductive layer and the second outer conductive layer in the stacking direction. The plural outer electrodes include first and second outer electrodes. The first outer electrode is disposed at least on the first main surface of the base body. The second outer electrode is disposed at least on the first main surface of the base body so as to separate from the first outer electrode. The second outer electrode is not electrically connected to the first outer conductive layer in a direction along the first outer conductive layer. Each of the at least one inner conductive layer forms a first inner interface with one of the plural insulating layers which is adjacent to a corresponding inner conductive layer in the stacking direction on the side of the first main surface of the base body and also forms a second inner interface with one of the plural insulating layers which is adjacent to the corresponding inner conductive layer in the stacking direction on the side of the second main surface of the base body. The first outer conductive layer forms a first outer interface with one of the plural insulating layers which is adjacent to the first outer conductive layer in the stacking direction on the side of the first main surface of the base body and also forms a second outer interface with one of the plural insulating layers which is adjacent to the first outer conductive layer in the stacking direction on the side of the second main surface of the base body. The first outer conductive layer includes a first portion which overlaps a portion of the second outer electrode disposed on the first main surface of the base body as viewed in the stacking direction. A void layer is provided in at least one inner interface of the first and second inner interfaces. When the first portion of the first outer conductive layer is seen in cross sections along the stacking direction and a direction which is perpendicular to an extending direction of the first portion as viewed in the stacking direction, in at least one of the cross sections of the first portion, the void layer is provided neither in the first outer interface nor in the second outer interface.

According to an aspect of the disclosure, it is possible to provide a multilayer coil component which is able to reduce the occurrence of cracks in an insulating layer at the time of the mounting of the multilayer coil component while relaxing a stress inside a base body.

DESCRIPTION OF THE PREFERRED EMBODIMENTS

Figure 1:
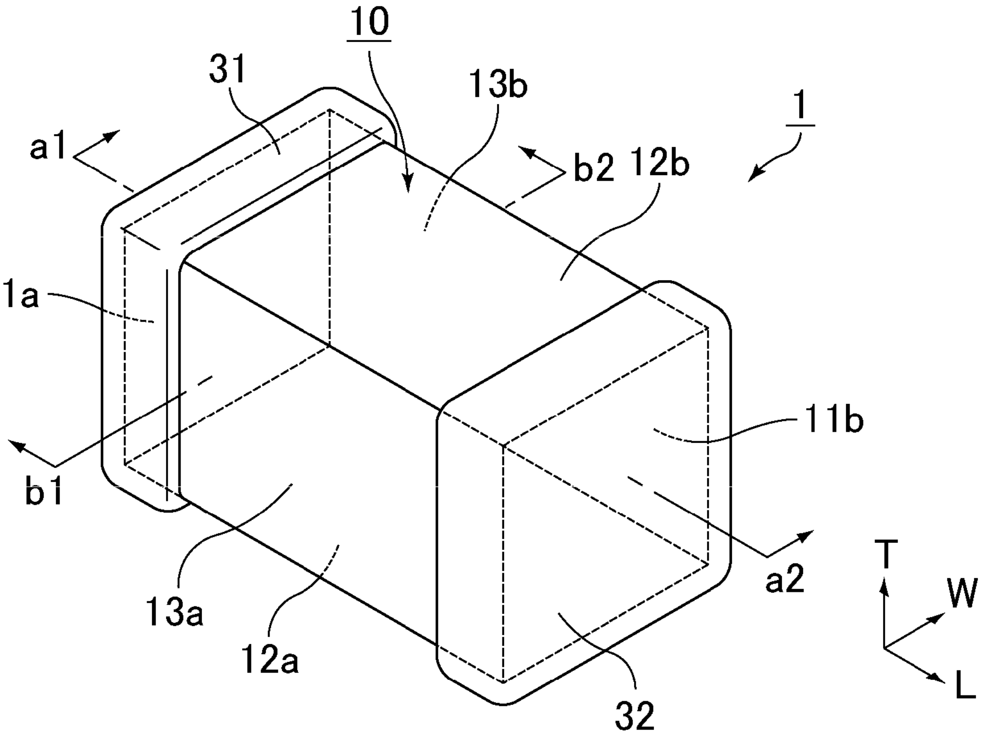
FIG. 1 is a schematic perspective view illustrating an example of a multilayer coil component according to an embodiment of the disclosure.

A multilayer coil component according to an embodiment of the disclosure will be described below. The disclosure is not restricted to the configurations described below and may be modified in a suitable manner within the spirit and scope of the disclosure. The individual configurations described below may be combined with each other in a suitable manner and the resulting configurations are also encompassed in the disclosure.

The drawings only schematically illustrate the elements, and the dimensions and the scales, such as the aspect ratios, of the elements may be different from those of actual products.

In the specification, terms representing the relationships between elements, such as "be parallel with" and "be perpendicular to", and the shapes of the elements are not strictly restricted to those described in the specification, and include substantially equivalent ranges, such as a range including about several percentage of difference from that described in the specification.

A multilayer coil component according to an embodiment of the disclosure includes a base body, plural conductive layers, and plural outer electrodes. The base body is constituted by plural insulating layers stacked on each other in a stacking direction. The plural conductive layers are disposed inside the base body and are stacked on each other in the stacking direction together with the plural insulating layers. The plural outer electrodes are each disposed on a surface of the base body. The base body has first and second main surfaces opposing each other in the stacking direction. At least some of the plural conductive layers are electrically connected to each other so as to form a coil which is electrically connected to the plural outer electrodes. The plural conductive layers include first and second outer conductive layers and at least one inner conductive layer. The first outer conductive layer is disposed at an outermost position of the base body in the stacking direction on a side of the first main surface. The second outer conductive layer is disposed at an outermost position of the base body in the stacking direction on a side of the second main surface. The at least one inner conductive layer is disposed between the first outer conductive layer and the second outer conductive layer in the stacking direction. The plural outer electrodes include first and second outer electrodes. The first outer electrode is disposed at least on the first main surface of the base body. The second outer electrode is disposed at least on the first main surface of the base body so as to separate from the first outer electrode. The second outer electrode is not electrically connected to the first outer conductive layer in a direction along the first outer conductive layer. Each of the at least one inner conductive layer forms a first inner interface with one of the plural insulating layers which is adjacent to a corresponding inner conductive layer in the stacking direction on the side of the first main surface and also forms a second inner interface with one of the plural insulating layers which is adjacent to the corresponding inner conductive layer in the stacking direction on the side of the second main surface. The first outer conductive layer forms a first outer interface with one of the plural insulating layers which is adjacent to the first outer conductive layer in the stacking direction on the side of the first main surface and also forms a second outer interface with one of the plural insulating layers which is adjacent to the first outer conductive layer in the stacking direction on the side of the second main surface. The first outer conductive layer includes a first portion which overlaps a portion of the second outer electrode disposed on the first main surface of the base body as viewed in the stacking direction. A void layer is provided in at least one of the first and second inner interfaces. When the first portion of the first outer conductive layer is seen in cross sections along the stacking direction and a direction which is perpendicular to an extending direction of the first portion as viewed in the stacking direction, in at least one of the cross sections of the first portion, the void layer is provided neither in the first outer interface nor in the second outer interface.

Figure 2:
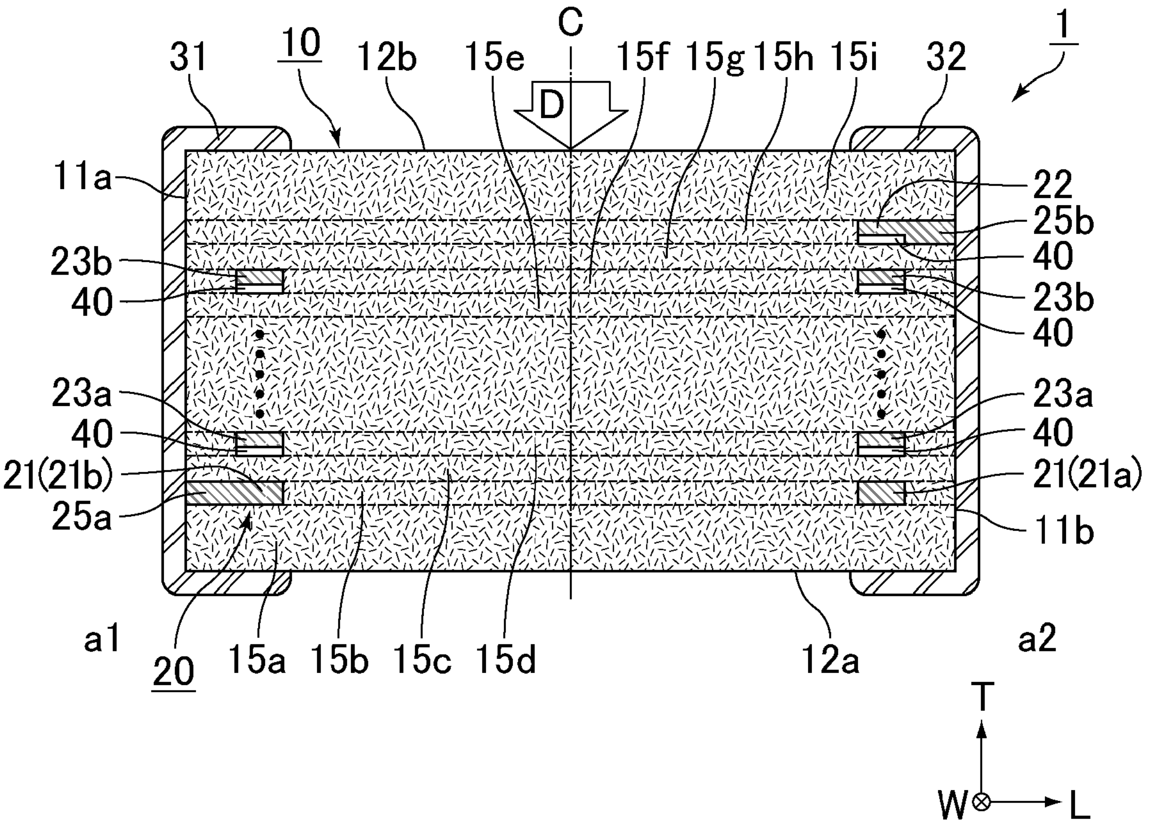
FIG. 2 is a schematic sectional view illustrating an example of a cross section of the multilayer coil component shown in FIG. 1 taken along line a1-a2.
Figure 3:
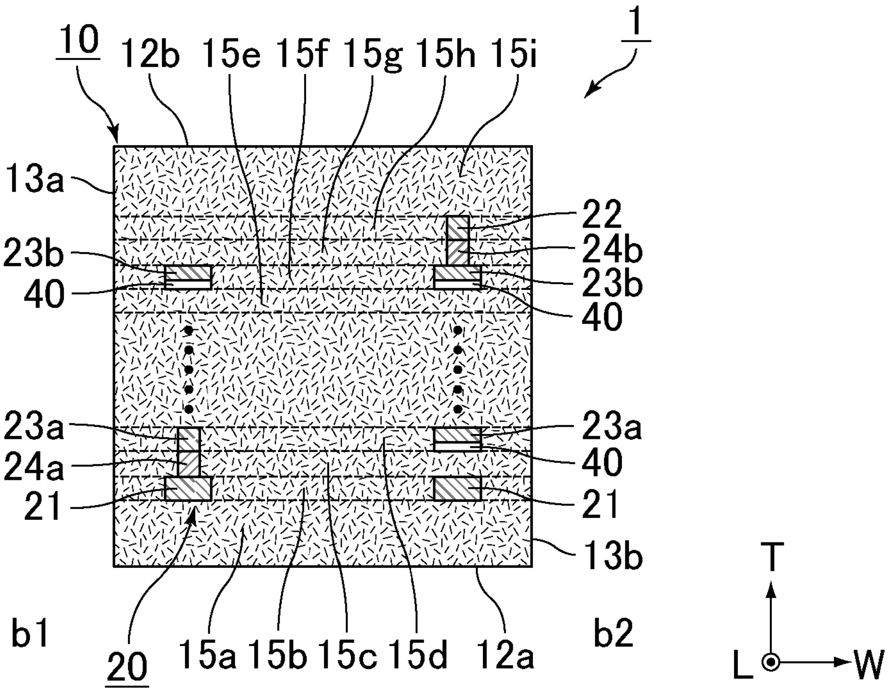
FIG. 3 is a schematic sectional view illustrating an example of a cross section of the multilayer coil component shown in FIG. 1 taken along line b1-b2.

FIG. 1 is a schematic perspective view illustrating an example of a multilayer coil component according to an embodiment of the disclosure. FIG. 2 is a schematic sectional view illustrating an example of a cross section of the multilayer coil component shown in FIG. 1 taken along line a1-a2. FIG. 3 is a schematic sectional view illustrating an example of a cross section of the multilayer coil component shown in FIG. 1 taken along line b1-b2.

A multilayer coil component 1 shown in FIGS. 1, 2, and 3 include a base body 10, a coil 20, a first outer electrode 31, and a second outer electrode 32.

In the specification, a length direction, a height direction, and a width direction are set to be directions represented by L, T, and W, respectively, indicated in FIG. 1 and the other drawings. The length direction L, the height direction T, and the width direction W are perpendicular to each other.

As illustrated in FIG. 1, the base body 10 has first and second end surfaces 11*a* and 11*b* opposing each other in the length direction L, first and second main surfaces 12*a* and 12*b* opposing each other in the height direction T, and first and second side surfaces 13*a* and 13*b* opposing in the width direction W. The shape of the base body 10 is a rectangular cuboid, for example. In the specification, the rectangular cuboid includes a substantially rectangular cuboid. For example, the rectangular cuboid includes a substantially rectangular cuboid having rounded corners and rounded ridges, which will be discussed later.

It is not necessary that the first and second end surfaces 11*a* and 11*b* of the base body 10 be exactly perpendicular to the length direction L. It is not necessary that the first and second main surfaces 12*a* and 12*b* of the base body 10 be exactly perpendicular to the height direction T. It is not necessary that the first and second side surfaces 13*a* and 13*b* of the base body 10 be exactly perpendicular to the width direction W.

In the specification, assuming that the height direction is a vertical direction, the first main surface of the base body is the bottom side, while the second main surface of the base body is the top side. However, the orientations of the first and second main surfaces are not limited to those described above and are suitably changed depending on a state in which the multilayer coil component is placed.

In the examples shown in FIGS. 1, 2, and 3, at the time of the mounting of the multilayer coil component 1, the first main surface 12*a* of the base body 10 is used as the mounting surface of the multilayer coil component 1 which faces a subject device (such as a substrate) to mount the multilayer coil component 1 thereon. In the multilayer coil component 1, the mounting surface of the base body 10, that is, the first main surface 12*a* of the base body 10 in this example, may be marked to make the mounting surface noticeable.

It is preferable that the corners and ridges of the base body 10 be rounded. A corner of the base body 10 is a portion where three surfaces of the base body 10 meet. A ridge of the base body 10 is a portion where two surfaces of the base body 10 meet.

As illustrated in FIGS. 2 and 3, the base body 10 is constituted by multiple insulating layers stacked on each other in a stacking direction.

In the examples in FIGS. 2 and 3, the base body 10 is constituted by multiple insulating layers including insulating layers 15*a*, 15*b*, 15*c*, 15*d*, 15*e*, 15*f*, 15*g*, 15*h*, and 15*i* stacked on each other in the height direction T.

In the examples in FIGS. 2 and 3, the base body 10 includes the insulating layers 15*a*, 15*b*, 15*c*, 15*d*, 15*e*, 15*f*, 15*g*, 15*h*, and 15*i* in this order in a direction from the first main surface 12*a* toward the second main surface 12*b* in the height direction T.

In the examples in FIGS. 2 and 3, the stacking direction of the multiple insulating layers is parallel with the height direction T. That is, in the examples in FIGS. 2 and 3, the stacking direction of the multiple insulating layers is perpendicular to the first main surface 12*a*, which is the mounting surface, of the base body 10.

Although the boundaries between the multiple insulating layers are shown in FIGS. 2 and 3 for the sake of convenience, they are not clearly seen in the base body of an actual multilayer coil component.

As the material for each insulating layer, a magnetic ferrite material or a non-magnetic ferrite material, for example, may be used.

The magnetic ferrite material preferably contains Fe, Zn, Cu, and Ni. In this case, assuming that the total amount of the magnetic ferrite material is 100 mol %, preferably, Fe contains 40 mol % to 49.5 mol % in terms of $Fe_2O_3$, Zn contains 5 mol % to 35 mol % in terms of ZnO, Cu contains 4 mol % to 12 mol % in terms of CuO, and Ni composes the balance in terms of NiO. The magnetic ferrite material may also contain additives, such as Mn, Co, Sn, Bi, and Si. The magnetic ferrite material may also contain inevitable impurities.

The non-magnetic ferrite material preferably contains Fe, Cu, and Zn. In this case, assuming that the total amount of the non-magnetic ferrite material is 100 mol %, preferably, Fe contains 40 mol % to 49.5 mol % in terms of $Fe_2O_3$, Cu contains 6 mol % to 12 mol % in terms of CuO, and Zn composes the balance in terms of ZnO. The non-magnetic ferrite material may also contain additives, such as Mn, Co, Sn, Bi, and Si. The magnetic ferrite material may also contain inevitable impurities.

The materials for the individual insulating layers may be the same or may be different from each other. The materials for the individual insulating layers may be partially different from each other.

The thicknesses of the insulating layers (dimension in the height direction T in this example) may be the same or may be different from each other. The thicknesses of the insulating layers may be partially different from each other.

As illustrated in FIGS. 2 and 3, the coil 20 is formed by electrically connecting at least some of conductive layers. The conductive layers are provided inside the base body 10 and are stacked on each other in the stacking direction together with the insulating layers.

In the examples in FIGS. 2 and 3, multiple conductive layers including a first outer conductive layer 21, a second outer conductive layer 22, and inner conductive layers 23*a* and 23*b* are provided inside the base body 10.

Among the multiple conductive layers, the first outer conductive layer 21 is located at the outermost position in the stacking direction (height direction T in this example) on the side of the first main surface 12*a* of the base body 10.

Among the multiple conductive layers, the second outer conductive layer 22 is located at the outermost position in the stacking direction (height direction T in this example) on the side of the second main surface 12*b* of the base body 10.

Between the first and second outer conductive layers 21 and 22, the first outer conductive layer 21 is located close to the mounting surface of the base body 10, which is the first main surface 12*a* of the base body 10 in this example, while the second outer conductive layer 22 is located close to the surface opposite the mounting surface of the base body 10, which is the second main surface 12*b* of the base body 10 in this example. That is, at the time of the mounting of the multilayer coil component 1 on a subject device, in the stacking direction (height direction T in this example), the first outer conductive layer 21 is positioned more closely to the subject device than the second outer conductive layer 22 is.

Among the multiple conductive layers, the inner conductive layers 23*a* and 23*b* are disposed between the first outer conductive layer 21 and the second outer conductive layer 22 in the stacking direction (height direction T in this example).

As the inner conductive layers disposed between the first outer conductive layer 21 and the second outer conductive layer 22 in the stacking direction (height direction T in this example), the inner conductive layers 23*a* and 23*b* are shown in FIGS. 2 and 3. However, at least another inner conductive layer may be disposed in addition to the inner conductive layers 23*a* and 23*b*. Only one inner conductive layer may be provided or plural inner conductive layers may be provided.

In the examples in FIGS. 2 and 3, the first outer conductive layer 21, second outer conductive layer 22, and inner conductive layers 23*a* and 23*b* are stacked on each other in the height direction T, together with the insulating layers 15*a* through 15*i*.

In the examples in FIGS. 2 and 3, the first outer conductive layer 21, inner conductive layers 23*a* and 23*b*, and second outer conductive layer 22 are stacked on each other in this order in the direction from the first main surface 12*a* toward the second main surface 12*b* of the base body 10 in the height direction T.

In the examples in FIGS. 2 and 3, all the conductive layers including the first outer conductive layer 21, second outer conductive layer 22, and inner conductive layers 23*a* and 23*b* are electrically connected to each other, thereby forming the coil 20.

In the example in FIG. 3, the first outer conductive layer 21 and the inner conductive layer 23*a* are electrically connected to each other via a connecting conductor 24*a*.

A land is provided at a position which continues to the first outer conductive layer 21, for example, to an end portion of the first outer conductive layer 21, and which is at least connected to the connecting conductor 24*a*. A land is also provided at a position which continues to the inner conductive layer 23*a*, for example, to an end portion of the inner conductive layer 23*a*, and which is at least connected to the connecting conductor 24*a*.

In the example in FIG. 3, the second outer conductive layer 22 and the inner conductive layer 23*b* are electrically connected to each other via a connecting conductor 24*b*.

A land is provided at a position which continues to the second outer conductive layer 22, for example, to an end portion of the second outer conductive layer 22, and which is at least connected to the connecting conductor 24*b*. A land is also provided at a position which continues to the inner conductive layer 23*b*, for example, to an end portion of the inner conductive layer 23*b*, and which is at least connected to the connecting conductor 24*b*.

In the specification, the lands are included neither in the outer conductive layers nor in the inner conductive layers. As viewed in the stacking direction (height direction T in this example), a land includes a portion which is connected to a connecting conductor and has an area, which is 120% of the area of the portion connected to the connecting conductor.

In the examples in FIGS. 2 and 3, the stacking direction of the multiple conductive layers are parallel with the height direction T. That is, in the examples in FIGS. 2 and 3, the stacking direction of the multiple conductive layers is perpendicular to the first main surface 12*a*, which is the mounting surface, of the base body 10.

In the example in FIG. 2, the coil axis C of the coil 20 extends in the height direction T. That is, in the example in FIG. 2, the direction of the coil axis C of the coil 20 is perpendicular to the first main surface 12*a*, which is the mounting surface, of the base body 10.

Hence, in the examples in FIGS. 2 and 3, the stacking direction of the multiple insulating layers, the stacking direction of the multiple conductive layers, and the direction of the coil axis C of the coil 20 extend along the height direction T and are perpendicular to the first main surface 12*a*, which is the mounting surface, of the base body 10.

As viewed in the stacking direction (height direction T in this example), the individual conductive layers may be formed in a shape constituted only by straight lines or only by curved lines, or constituted by straight lines and curved lines. That is, as viewed in the stacking direction (height direction T in this example), the coil 20 may be formed in a shape constituted only by straight lines or only by curved lines, or constituted by straight lines and curved lines. For example, as seen in the stacking direction (height direction T in this example), the coil 20 may be formed in a polygonal shape, a circular shape, or an elliptical shape, for example.

Examples of the material for the individual conductive layers are Ag, Au, Cu, Pd, Ni, Al, and an alloy containing at least one of these metals.

The thicknesses of the individual conductive layers (dimension in the height direction T in this example) may be the same or may be different from each other. The thicknesses of the individual conductive layers may be partially different from each other.

Examples of the material for the individual connecting conductors are Ag, Au, Cu, Pd, Ni, Al, and an alloy containing at least one of these metals.

The thicknesses of the individual connecting conductors (dimension in the height direction T in this example) may be the same or may be different from each other. The thicknesses of the individual connecting conductors may be partially different from each other.

As illustrated in FIG. 2, the coil 20 is electrically connected to the first outer electrode 31.

In the example in FIG. 2, the first outer conductive layer 21 forming the coil 20 is electrically connected to the first outer electrode 31 via a first extending conductor 25*a* positioned at one end of the first outer conductive layer 21. More specifically, in the example in FIG. 2, the first extending conductor 25*a* is exposed at the first end surface 11*a* of the base body 10, and the first outer electrode 31 is connected to the exposed portion of the first extending conductor 25*a*.

As illustrated in FIG. 2, the coil 20 is electrically connected to the second outer electrode 32.

In the example in FIG. 2, the second outer conductive layer 22 forming the coil 20 is electrically connected to the second outer electrode 32 via a second extending conductor 25*b* positioned at one end of the second outer conductive layer 22. More specifically, in the example in FIG. 2, the second extending conductor 25*b* is exposed at the second end surface 11*b* of the base body 10, and the second outer electrode 32 is connected to the exposed portion of the second extending conductor 25*b*.

In the specification, the extending conductors are each contained in the corresponding outer conductive layer or the corresponding inner conductive layer.

Examples of the material for the individual extending conductors are Ag, Au, Cu, Pd, Ni, Al, and an alloy containing at least one of these metals.

The thicknesses of the individual extending conductors (dimension in the height direction T in this example) may be the same or may be different from each other. The thicknesses of the individual extending conductors may be partially different from each other.

As illustrated in FIG. 1, the first outer electrode 31 is disposed on a surface of the base body 10. More specifically, the first outer electrode 31 is disposed at least on the first main surface 12*a* of the base body 10. As shown in FIG. 1, the first outer electrode 31 may be disposed on the second main surface 12*b* of the base body 10 in addition to the first main surface 12*a*. In the example in FIG. 1, the first outer electrode 31 extends from the first end surface 11*a* of the base body 10 to part of each of the first main surface 12*a*, second main surface 12*b*, first side surface 13*a*, and second side surface 13*b*.

The mode in which the first outer electrode 31 is arranged is not limited to that shown in FIG. 1. For example, the first outer electrode 31 may extend from part of the first main surface 12*a* of the base body 10 to part of each of the first end surface 11*a*, first side surface 13*a*, and second side surface 13*b*.

As illustrated in FIG. 1, the second outer electrode 32 is disposed on a surface of the base body 10. More specifically, the second outer electrode 32 is disposed at least on the first main surface 12*a* of the base body 10. As shown in FIG. 1, the second outer electrode 32 may be disposed on the second main surface 12*b* of the base body 10 in addition to the first main surface 12*a*. In the example in FIG. 1, the second outer electrode 32 extends from the second end surface 11*b* of the base body 10 to part of each of the first main surface 12*a*, second main surface 12*b*, first side surface 13*a*, and second side surface 13*b*.

The mode in which the second outer electrode 32 is arranged is not limited to that shown in FIG. 1. For example, the second outer electrode 32 may extend from part of the first main surface 12*a* of the base body 10 to part of each of the second end surface 11*b*, first side surface 13*a*, and second side surface 13*b*.

In this manner, the second outer electrode 32 is provided to separate from the first outer electrode 31 (to separate in the length direction L in this example).

As described above, the first outer electrode 31 and the second outer electrode 32 are disposed on the first main surface 12*a*, which is the mounting surface, of the base body 10. This is likely to enhance the mountability of the multilayer coil component 1.

As illustrated in FIG. 2, the second outer electrode 32 is not electrically connected to the first outer conductive layer 21 in the direction along the first outer conductive layer 21.

In the multilayer coil component 1, the connection modes between the conductive layers and the outer electrodes are not restricted to any particular mode as long as the second outer electrode 32 is not electrically connected to the first outer conductive layer 21 in the direction along the first outer conductive layer 21. In the example in FIG. 2, the connection modes are as follows.

In the example in FIG. 2, the first outer electrode 31 is electrically connected to the first outer conductive layer 21 in the direction along the first outer conductive layer 21.

In the example in FIG. 2, the first outer electrode 31 is not electrically connected to the second outer conductive layer 22 in the direction along the second outer conductive layer 22.

In the example in FIG. 2, the second outer electrode 32 is electrically connected to the second outer conductive layer 22 in the direction along the second outer conductive layer 22.

In the specification, the direction along the outer conductive layer substantially corresponds to the extending direction (including the length direction L and the width direction Win this example) of a plane which includes the outer conductive layer and which is perpendicular to the stacking direction (height direction T in this example).

The first outer electrode 31 and the second outer electrode 32 may each have a single layer structure or a multilayer structure.

If the first outer electrode 31 and the second outer electrode 32 each have a single layer structure, examples of the material for the first and second outer electrodes 31 and 32 are Ag, Au, Cu, Pd, Ni, Al, and an alloy containing at least one of these metals.

If the first outer electrode 31 and the second outer electrode 32 each have a multilayer structure, they may each include an underlying electrode containing Ag, a Ni-plated electrode, and a Sn-plated electrode in this order from the surface of the base body 10.

As illustrated in FIGS. 2 and 3, each of the inner conductive layers forms a first inner interface with the insulating layer which is adjacent to the corresponding inner conductive layer in the stacking direction (height direction T in this example) on the side of the first main surface 12*a* of the base body 10. Each of the inner conductive layers also forms a second inner interface with the insulating layer which is adjacent to the corresponding inner conductive layer in the stacking direction (height direction T in this example) on the side of the second main surface 12*b* of the base body 10.

In the specification, the interface between the conductive layer and the insulating layer is an interface between the conductive layer and the insulating layer along a plane (defined by the length direction L and the width direction W in this example) perpendicular to the stacking direction (height direction T in this example).

As illustrated in FIGS. 2 and 3, among all the first and second inner interfaces, a void layer 40 is provided in at least one inner interface.

In the examples in FIGS. 2 and 3, the void layer 40 is provided in the first inner interface between the inner conductive layer 23*a* and the insulating layer 15*c* and in the first inner interface between the inner conductive layer 23*b* and the insulating layer 15*e*.

The void layer 40 may be provided in the second inner interface between the inner conductive layer 23*a* and an insulating layer other than the insulating layer 15*c*. The void layer 40 may be provided in the second inner interface between the inner conductive layer 23*b* and an insulating layer other than the insulating layer 15*e*.

Inner conductive layers other than the inner conductive layers 23*a* and 23*b* are not shown in FIGS. 2 and 3. If such inner conductive layers are disposed, the void layer 40 may be provided in at least one of the first inner interface and the second inner interface between the corresponding inner conductive layer and the adjacent insulating layer.

As described above, it is sufficient if the void layer 40 is provided in at least one inner interface among all the first and second inner interfaces. For the inner interface provided with the void layer 40 among all the first and second inner interfaces, the void layer 40 may be provided in the entirety or part of this interface.

It is preferable that the void layer 40 be provided in at least part of each of the first and second inner interfaces. For example, if a total of ten first and second inner interfaces are disposed, the void layer 40 may preferably be provided in at least part of each of these ten interfaces. In this case, it is more preferable that the void layer 40 be provided in the entirety of at least one of the first inner interface and the second inner interface of each inner conductive layer. In other words, the void layer 40 may be provided in the entirety of at least one of the first and second inner interfaces or both of the first and second inner interfaces of each inner conductive layer.

In the multilayer coil component 1, among all the first and second inner interfaces, the void layer 40 is provided in at least one inner interface. This can relax a stress occurring in the base body 10 which is caused by a difference of the coefficient of thermal contraction between the inner conductive layer and the insulating layer, for example.

When a known multilayer coil component, such as the multilayer inductor disclosed in Japanese Unexamined Patent Application Publication No. H11-219821, is mounted on a subject device, such as a substrate, an impact load is applied to the multilayer coil component in the stacking direction. When the multilayer coil component is mounted on the subject device, a gap is formed between the mounting surface of the base body and the subject device by an amount equal to the thickness of the outer electrodes. Because of this gap, a stress caused by the impact load is applied to the base body in the direction from the surface opposite the mounting surface in the stacking direction to the mounting surface. When a stress caused by the impact load is applied to the base body in this manner, because of the reaction from the subject device, another stress is applied especially to the outer electrodes disposed near the mounting surface of the base body and to the adjacent insulating layers in a direction opposite the direction of the stress caused by the impact load. Applying of the two types of stresses to the multilayer coil component in this manner causes a tensile stress inside the base body. As a result, the base body is distorted. The tensile stress does not considerably concentrate on the interface between the insulating layer forming the mounting surface of the base body and the outer electrode, but concentrates on the interface between the insulating layer and a void layer, which is provided in the interface between the insulating layer and the conductive layer located at the outermost position in the stacking direction on the side of the mounting surface and which overlaps the outer electrode in the stacking direction. If the strength of the tensile stress is greater than that of the insulating layer, the insulating layer cracks starting from the void layer. A distribution of a tensile stress occurring in the base body at the time of the mounting of the multilayer coil component has been simulated using finite element analysis software "Femtet (registered trademark)" made by Murata Software Co., Ltd. It has been found that the tensile stress is distributed as described above in the insulating layer forming the mounting surface of the base body.

To address this issue, the multilayer coil component 1 is configured as follows.

As illustrated in FIGS. 2 and 3, the first outer conductive layer 21 forms a first outer interface with the insulating layer 15*a* that is adjacent to the first outer conductive layer 21 in the stacking direction (height direction T in this example) on the side of the first main surface 12*a* of the base body 10 and also forms a second outer interface with the insulating layer 15*c* that is adjacent to the first outer conductive layer 21 in the stacking direction (height direction T in this example) on the side of the second main surface 12*b* of the base body 10.

Figure 4:
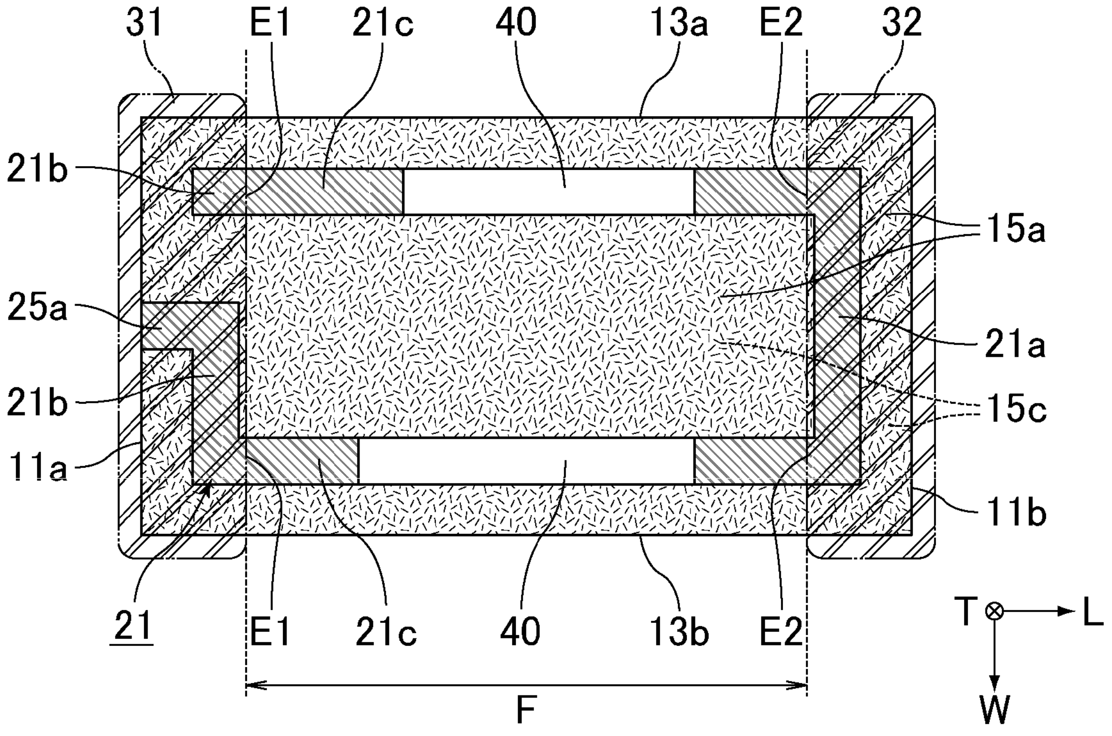
FIG. 4 is a schematic plan view illustrating a state in which the multilayer coil component shown in FIGS. 2 and 3 is seen through from a first main surface of a base body.
Figure 5:
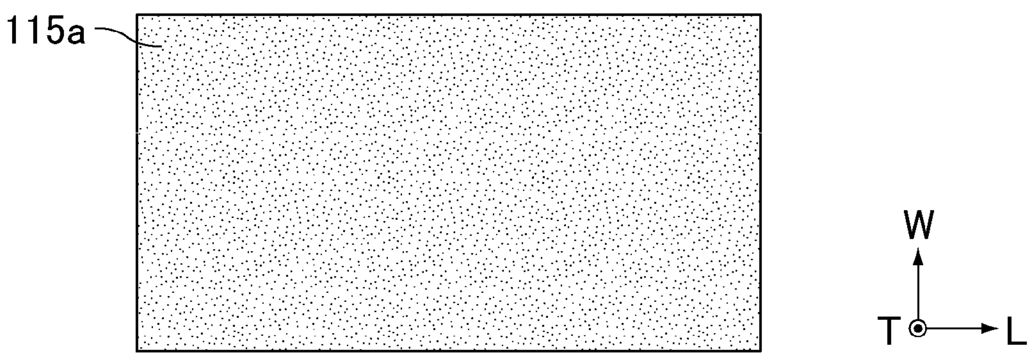
FIG. 5 is a schematic plan view for explaining a step of forming a multilayer body block in an example of a manufacturing method for a multilayer coil component of an embodiment of the disclosure.

FIG. 4 is a schematic plan view illustrating a state in which the multilayer coil component shown in FIGS. 2 and 3 is seen through from the first main surface of the base body.

FIG. 4 shows a state in which the first and second outer electrodes 31 and 32 and the insulating layer 15*a* are seen through to focus on the first outer conductive layer 21 and the void layer 40. In actuality, when the multilayer coil component 1 is seen from the side of the first main surface 12*a* of the base body 10, the insulating layer 15*a* is positioned on the near side over the first outer conductive layer 21 and the void layer 40 and overlaps them. In FIG. 4, however, the insulating layer 15*a*, which overlaps the first outer conductive layer 21 and the void layer 40, is not shown.

As shown in FIG. 4, the first outer conductive layer 21 has a first portion 21*a*, which overlaps a portion of the second outer electrode 32 located on the first main surface 12*a* of the base body 10 as viewed in the stacking direction (height direction T in this example). In the example in FIG. 4, the first portion 21*a* of the first outer conductive layer 21 extends in the widthwise direction (width direction W in this example) of the base body 10.

A cross section along the length direction L and the height direction T of the configuration illustrated in FIG. 4 is shown in FIG. 2. As illustrated in FIG. 2, when the first portion 21*a* of the first outer conductive layer 21 is seen in cross sections along the stacking direction (height direction T in FIG. 2) and a direction (length direction L in FIG. 2) which is perpendicular to the extending direction (width direction W in FIG. 2) of the first portion 21*a* of the first outer conductive layer 21 as viewed in the stacking direction (height direction T in FIG. 2), in at least one of the cross sections of the first portion 21*a*, the void layer 40 is provided neither in the first outer interface (interface of the first outer conductive layer 21 between the first portion 21*a* and the insulating layer 15*a* in FIG. 2) nor in the second outer interface (interface of the first outer conductive layer 21 between the first portion 21*a* and the insulating layer 15*c* in FIG. 2).

In the multilayer coil component 1, when the first portion 21*a* of the first outer conductive layer 21 is seen in cross sections along the stacking direction (height direction T in FIG. 2) and a direction (length direction L in FIG. 2) which is perpendicular to the extending direction (width direction Win FIG. 2) of the first portion 21*a* of the first outer conductive layer 21 as viewed in the stacking direction (height direction Tin FIG. 2), as long as at least one cross section where the void layer 40 is provided neither in the first outer interface of the first portion 21*a* nor in the second outer interface of the first portion 21*a* is found, the arrangement mode of the void layer 40 in the other cross sections of the first portion 21*a* is not restricted to any particular arrangement. In the examples in FIGS. 2 and 4, the arrangement mode of the void layer 40 is as follows.

In the examples in FIGS. 2 and 4, in the first outer interface between the first outer conductive layer 21 and the insulating layer 15*a*, the void layer 40 is not provided in at least part of a region of the first outer interface which overlaps the first portion 21*a* of the first outer conductive layer 21 as viewed in the stacking direction (height direction T in this example). With this configuration, at the time of the mounting of the multilayer coil component 1, even when an impact load D is applied to the multilayer coil component 1 in the stacking direction (height direction T in this example) as shown in FIG. 2, a tensile stress occurring in the insulating layer 15*a* in the vicinity of the first portion 21*a* of the first outer conductive layer 21 can be relaxed. It is thus possible to reduce the occurrence of cracks in the insulating layer 15*a* in the vicinity of the first portion 21*a* of the first outer conductive layer 21 at the time of the mounting of the multilayer coil component 1.

Likewise, in the examples in FIGS. 2 and 4, in the second outer interface between the first outer conductive layer 21 and the insulating layer 15*c*, the void layer 40 is not provided in at least part of a region of the second outer interface which overlaps the first portion 21$a$ of the first outer conductive layer 21 as viewed in the stacking direction (height direction T in this example). With this configuration, at the time of the mounting of the multilayer coil component 1, a tensile stress occurring in the insulating layer 15$c$ in the vicinity of the first portion 21$a$ of the first outer conductive layer 21 can be relaxed. It is thus possible to reduce the occurrence of cracks in the insulating layer 15$c$ in the vicinity of the first portion 21$a$ of the first outer conductive layer 21 at the time of the mounting of the multilayer coil component 1.

In the specification, the mode in which, in the interface between the outer conductive layer and the insulating layer, the void layer is not provided in at least part of a region of the interface which overlaps a corresponding portion (first portion, for example) of the outer conductive layer as viewed in the stacking direction (height direction T in this example) refers to the following mode. In the interface between a corresponding portion (first portion, for example) of the outer conductive layer and the insulating layer, there is at least one portion where the void layer is not provided in the entirety of a region from one end to the other end of the corresponding portion (first portion, for example) of the outer conductive layer in a direction perpendicular to the extending direction of the corresponding portion (first portion, for example) of the outer conductive layer as viewed in the stacking direction (height direction T in this example).

As illustrated in FIG. 4, it is preferable that, in the first outer interface between the first outer conductive layer 21 and the insulating layer 15$a$, the void layer 40 be not provided in the entirety of the region of the first outer interface which overlaps the first portion 21$a$ of the first outer conductive layer 21 as viewed in the stacking direction (height direction T in this example). With this configuration, at the time of the mounting of the multilayer coil component 1, a tensile stress occurring in the insulating layer 15$a$ in the vicinity of the first portion 21$a$ of the first outer conductive layer 21 can be sufficiently relaxed. It is thus possible to sufficiently reduce the occurrence of cracks in the insulating layer 15$a$ in the vicinity of the first portion 21$a$ of the first outer conductive layer 21 at the time of the mounting of the multilayer coil component 1.

Likewise, it is preferable that, in the second outer interface between the first outer conductive layer 21 and the insulating layer 15$c$, the void layer 40 be not provided in the entirety of the region of the second outer interface which overlaps the first portion 21$a$ of the first outer conductive layer 21 as viewed in the stacking direction (height direction T in this example). With this configuration, at the time of the mounting of the multilayer coil component 1, a tensile stress occurring in the insulating layer 15$c$ in the vicinity of the first portion 21$a$ of the first outer conductive layer 21 can be sufficiently relaxed. It is thus possible to sufficiently reduce the occurrence of cracks in the insulating layer 15$c$ in the vicinity of the first portion 21$a$ of the first outer conductive layer 21 at the time of the mounting of the multilayer coil component 1.

As is seen from the foregoing description, it is more preferable that the void layer 40 be not provided in the entirety of the region of at least one of the first and second outer interfaces which overlaps the first portion 21$a$ of the first outer conductive layer 21 as viewed in the stacking direction (height direction T in this example). It is even more preferable that the void layer 40 be not provided in the entirety of the regions of both of the first and second outer interfaces which overlap the first portion 21$a$ of the first outer conductive layer 21 as viewed in the stacking direction (height direction T in this example).

As shown in FIG. 4, the first outer conductive layer 21 may also have a second portion 21$b$, which overlaps a portion of the first outer electrode 31 located on the first main surface 12$a$ of the base body 10 as viewed in the stacking direction (height direction T in this example). In the example in FIG. 4, part of the second portion 21$b$ of the first outer conductive layer 21 extends in the widthwise direction (width direction W in this example) of the base body 10.

As illustrated in FIG. 4, it is preferable that, in the first outer interface between the first outer conductive layer 21 and the insulating layer 15$a$, the void layer 40 be not provided in at least part of the region of the first outer interface which overlaps the second portion 21$b$ of the first outer conductive layer 21 as viewed in the stacking direction (height direction T in this example). With this configuration, at the time of the mounting of the multilayer coil component 1, a tensile stress occurring in the insulating layer 15$a$ in the vicinity of the second portion 21$b$ of the first outer conductive layer 21 can be relaxed. It is thus possible to reduce the occurrence of cracks in the insulating layer 15$a$ in the vicinity of the second portion 21$b$ of the first outer conductive layer 21 at the time of the mounting of the multilayer coil component 1.

Likewise, it is preferable that, in the second outer interface between the first outer conductive layer 21 and the insulating layer 15$c$, the void layer 40 be not provided in at least part of the region of the second outer interface which overlaps the second portion 21$b$ of the first outer conductive layer 21 as viewed in the stacking direction (height direction T in this example). With this configuration, at the time of the mounting of the multilayer coil component 1, a tensile stress occurring in the insulating layer 15$c$ in the vicinity of the second portion 21$b$ of the first outer conductive layer 21 can be relaxed. It is thus possible to reduce the occurrence of cracks in the insulating layer 15$c$ in the vicinity of the second portion 21$b$ of the first outer conductive layer 21 at the time of the mounting of the multilayer coil component 1.

As is seen from the foregoing description, it is more preferable that the void layer 40 be not provided in at least part of the region of at least one of the first and second outer interfaces which overlaps the second portion 21$b$ of the first outer conductive layer 21 as viewed in the stacking direction (height direction T in this example). It is even more preferable that the void layer 40 be not provided in at least part of the region of each of the first and second outer interfaces which overlaps the second portion 21$b$ of the first outer conductive layer 21 as viewed in the stacking direction (height direction T in this example).

It is preferable that, in the first outer interface between the first outer conductive layer 21 and the insulating layer 15$a$, the void layer 40 be not provided in the entirety of the region of the first outer interface which overlaps the second portion 21$b$ of the first outer conductive layer 21 as viewed in the stacking direction (height direction T in this example). With this configuration, at the time of the mounting of the multilayer coil component 1, a tensile stress occurring in the insulating layer 15$a$ in the vicinity of the second portion 21$b$ of the first outer conductive layer 21 can be sufficiently relaxed. It is thus possible to sufficiently reduce the occurrence of cracks in the insulating layer 15$a$ in the vicinity of the second portion 21$b$ of the first outer conductive layer 21 at the time of the mounting of the multilayer coil component 1.

Likewise, it is preferable that, in the second outer interface between the first outer conductive layer 21 and the insulating layer 15*c*, the void layer 40 be not provided in the entirety of the region of the second outer interface which overlaps the second portion 21*b* of the first outer conductive layer 21 as viewed in the stacking direction (height direction T in this example). With this configuration, at the time of the mounting of the multilayer coil component 1, a tensile stress occurring in the insulating layer 15*c* in the vicinity of the second portion 21*b* of the first outer conductive layer 21 can be sufficiently relaxed. It is thus possible to sufficiently reduce the occurrence of cracks in the insulating layer 15*c* in the vicinity of the second portion 21*b* of the first outer conductive layer 21 at the time of the mounting of the multilayer coil component 1.

As is seen from the foregoing description, it is more preferable that the void layer 40 be not provided in the entirety of the region of at least one of the first and second outer interfaces which overlaps the second portion 21*b* of the first outer conductive layer 21 as viewed in the stacking direction (height direction T in this example). It is even more preferable that the void layer 40 be not provided in the entirety of the regions of both of the first and second outer interfaces which overlap the second portion 21*b* of the first outer conductive layer 21 as viewed in the stacking direction (height direction T in this example).

In terms of reducing the occurrence of cracks in the insulating layers 15*a* and 15*c* in the vicinities of the first portion 21*a* and the second portion 21*b* of the first outer conductive layer 21 at the time of the mounting of the multilayer coil component 1, it is even more preferable that, in the first outer interface between the first outer conductive layer 21 and the insulating layer 15*a*, the void layer 40 be not provided in the entirety of the regions of the first outer interface which overlap the first portion 21*a* and the second portion 21*b* of the first outer conductive layer 21 as viewed in the stacking direction and that, in the second outer interface between the first outer conductive layer 21 and the insulating layer 15*c*, the void layer 40 be not provided in the entirety of the regions of the second outer interface which overlap the first portion 21*a* and the second portion 21*b* of the first outer conductive layer 21 as viewed in the stacking direction.

As illustrated in FIG. 4, the first outer conductive layer 21 may include the first portion 21*a*, the second portion 21*b*, and a third portion 21*c*. As viewed in the stacking direction (height direction T in this example), the first portion 21*a* overlaps a portion of the second outer electrode 32 located on the first main surface 12*a* of the base body 10. As viewed in the stacking direction (height direction T in this example), the second portion 21*b* overlaps a portion of the first outer electrode 31 located on the first main surface 12*a* of the base body 10. The third portion 21*c* is a portion other than the first portion 21*a* and the second portion 21*b*. In the example in FIG. 4, the third portion 21*c* of the first outer conductive layer 21 extends in the longitudinal direction (length direction L in this example) of the base body 10.

As illustrated in FIG. 4, a dimension F from an end portion E1 of the first outer electrode 31 to an end portion E2 of the second outer electrode 32 in the extending direction of the third portion 21*c* of the first outer conductive layer 21 is defined. It is preferable that, in the first outer interface between the first outer conductive layer 21 and the insulating layer 15*a*, the void layer 40 be not provided in the entirety of the region of the first outer interface which overlaps the first portion 21*a* of the first outer conductive layer 21 as viewed in the stacking direction (height direction T in this example) and in the entirety of the region of the first outer interface which overlaps the second portion 21*b* of the first outer conductive layer 21 as viewed in the stacking direction (height direction T in this example) and also that the void layer 40 be not provided in at least part of the region of the first outer interface which overlaps the third portion 21*c* of the first outer conductive layer 21 as viewed in the stacking direction (height direction T in this example), and more specifically, the void layer 40 be not provided in a region of the first outer interface that overlaps the third portion 21*c* as viewed in the stacking direction (height direction T in this example), the region corresponding to 20% or more of the above-described dimension F. With this configuration, at the time of the mounting of the multilayer coil component 1, a tensile stress occurring in the insulating layer 15*a* in the vicinities of the first and second portions 21*a* and 21*b* of the first outer conductive layer 21 can be sufficiently relaxed. It is thus possible to sufficiently reduce the occurrence of cracks in the insulating layer 15*a* in the vicinities of the first and second portions 21*a* and 21*b* of the first outer conductive layer 21 at the time of the mounting of the multilayer coil component 1.

Likewise, it is preferable that, in the second outer interface between the first outer conductive layer 21 and the insulating layer 15*c*, the void layer 40 be not provided in the entirety of the region of the second outer interface which overlaps the first portion 21*a* of the first outer conductive layer 21 as viewed in the stacking direction (height direction T in this example) and in the entirety of the region of the second outer interface which overlaps the second portion 21*b* of the first outer conductive layer 21 as viewed in the stacking direction (height direction T in this example) and also that the void layer 40 be not provided in at least part of the region of the second outer interface which overlaps the third portion 21*c* of the first outer conductive layer 21 as viewed in the stacking direction (height direction T in this example), and more specifically, the void layer 40 be not provided in a region of the second outer interface that overlaps the third portion 21*c* as viewed in the stacking direction (height direction T in this example), the region corresponding to 20% or more of the above-described dimension F. With this configuration, at the time of the mounting of the multilayer coil component 1, a tensile stress occurring in the insulating layer 15*c* in the vicinities of the first and second portions 21*a* and 21*b* of the first outer conductive layer 21 can be sufficiently relaxed. It is thus possible to sufficiently reduce the occurrence of cracks in the insulating layer 15*c* in the vicinities of the first and second portions 21*a* and 21*b* of the first outer conductive layer 21 at the time of the mounting of the multilayer coil component 1.

As is seen from the foregoing description, it is more preferable that the void layer 40 be not provided in the entirety of the region of at least one of the first and second outer interfaces which overlaps the first portion 21*a* of the first outer conductive layer 21 as viewed in the stacking direction (height direction T in this example) and in the entirety of the region of at least one of the first and second outer interfaces which overlaps the second portion 21*b* of the first outer conductive layer 21 as viewed in the stacking direction (height direction T in this example) and also that the void layer 40 be not provided in at least part of the region of at least one of the first and second outer interfaces which overlaps the third portion 21*c* of the first outer conductive layer 21 as viewed in the stacking direction (height direction T in this example), and more specifically, the void layer 40 be not provided in a region of at least one of the first and second outer interfaces that overlaps the third portion 21*c* as viewed in the stacking direction (height direction T in this example), the region corresponding to 20% or more of the above-described dimension F. It is even more preferable that the void layer 40 be not provided in the entirety of the regions of both of the first and second outer interfaces which overlap the first portion 21*a* of the first outer conductive layer 21 as viewed in the stacking direction (height direction T in this example) and in the entirety of the regions of both of the first and second outer interfaces which overlap the second portion 21*b* of the first outer conductive layer 21 as viewed in the stacking direction (height direction T in this example) and also that the void layer 40 be not provided in at least part of the region of each of the first and second outer interfaces which overlaps the third portion 21*c* of the first outer conductive layer 21 as viewed in the stacking direction (height direction T in this example), and more specifically, the void layer 40 be not provided in a region of each of the first and second outer interfaces that overlaps the third portion 21*c* as viewed in the stacking direction (height direction T in this example), the region corresponding to 20% or more of the above-described dimension F.

It is preferable that the void layer 40 be not provided in the entirety of the first outer interface between the first outer conductive layer 21 and the insulating layer 15*a*. With this configuration, at the time of the mounting of the multilayer coil component 1, a tensile stress does not concentrate on any portion of the insulating layer 15*a* in the vicinity of the first outer conductive layer 21. It is thus possible to considerably reduce the occurrence of cracks in the insulating layer 15*a* in the vicinity of the first outer conductive layer 21 at the time of the mounting of the multilayer coil component 1.

Likewise, it is preferable that the void layer 40 be not provided in the entirety of the second outer interface between the first outer conductive layer 21 and the insulating layer 15*c*. With this configuration, at the time of the mounting of the multilayer coil component 1, a tensile stress does not concentrate on any portion of the insulating layer 15*c* in the vicinity of the first outer conductive layer 21. It is thus possible to considerably reduce the occurrence of cracks in the insulating layer 15*c* in the vicinity of the first outer conductive layer 21 at the time of the mounting of the multilayer coil component 1.

As is seen from the foregoing description, it is more preferable that the void layer 40 be not provided in the entirety of at least one of the first and second outer interfaces. It is even more preferable that the void layer 40 be not provided in the entirety of both of the first and second outer interfaces.

The ratio of the area of the void layer 40 to that of the first outer conductive layer 21 in the first outer interface between the first outer conductive layer 21 and the insulating layer 15*a* is preferably lower than the ratio of the area of the void layer 40 to that of the inner conductive layer in at least one inner interface (the first inner interface between the inner conductive layer 23*a* and the insulating layer 15*c*, for example) among all the first and second inner interfaces between the inner conductive layers and the insulating layers.

As discussed above, in the multilayer coil component 1, in the first outer interface between the first outer conductive layer 21 and the insulating layer 15*a*, the void layer 40 is not provided in at least part of the region of the first outer interface which overlaps the first portion 21*a* of the first outer conductive layer 21 as viewed in the stacking direction (height direction T in this example). Because of this configuration, the ratio of the area of the void layer 40 to that of the first outer conductive layer 21 in the first outer interface between the first outer conductive layer 21 and the insulating layer 15*a* becomes lower than 100%. Meanwhile, if the void layer 40 is provided in the entirety of the first inner interface between the inner conductive layer 23*a* and the insulating layer 15*c*, for example, the ratio of the area of the void layer 40 to that of the inner conductive layer 23*a* in the first inner interface between the inner conductive layer 23*a* and the insulating layer 15*c* becomes 100%. In this case, the ratio of the area of the void layer 40 to that of the first outer conductive layer 21 in the first outer interface between the first outer conductive layer 21 and the insulating layer 15*a* becomes lower than the ratio of the area of the void layer 40 to that of the inner conductive layer 23*a* in the first inner interface between the inner conductive layer 23*a* and the insulating layer 15*c*.

The ratio of the area of the void layer 40 to that of the first outer conductive layer 21 in the first outer interface between the first outer conductive layer 21 and the insulating layer 15*a* is lower than 100%, preferably 50% or lower, and more preferably 0%.

Likewise, the ratio of the area of the void layer 40 to that of the first outer conductive layer 21 in the second outer interface between the first outer conductive layer 21 and the insulating layer 15*c* is preferably lower than the ratio of the area of the void layer 40 to that of the inner conductive layer in at least one inner interface (the first inner interface between the inner conductive layer 23*a* and the insulating layer 15*c*, for example) among all the first and second inner interfaces between the inner conductive layers and the insulating layers.

The ratio of the area of the void layer 40 to that of the first outer conductive layer 21 in the second outer interface between the first outer conductive layer 21 and the insulating layer 15*c* is lower than 100%, preferably 50% or lower, and more preferably 0%.

As is seen from the foregoing description, the ratio of the area of the void layer 40 to that of the first outer conductive layer 21 in at least one of the first and second outer interfaces is preferably lower than the ratio of the area of the void layer 40 to that of the inner conductive layer in at least one inner interface (the first inner interface between the inner conductive layer 23*a* and the insulating layer 15*c*, for example) among all the first and second inner interfaces. More preferably, the ratio of the area of the void layer 40 to that of the first outer conductive layer 21 in both of the first and second outer interfaces is lower than the ratio of the area of the void layer 40 to that of the inner conductive layer in at least one inner interface (the first inner interface between the inner conductive layer 23*a* and the insulating layer 15*c*, for example) among all the first and second inner interfaces. Even more preferably, the ratio of the area of the void layer 40 to that of the first outer conductive layer 21 in both of the first and second outer interfaces is lower than the ratio of the area of the void layer 40 to that of the inner conductive layer in all the first and second inner interfaces.

In the first outer interface between the first outer conductive layer 21 and the insulating layer 15*a*, the ratio of the area of the void layer 40 to that of the region of the first outer interface which overlaps the first portion 21*a* of the first outer conductive layer 21 as viewed in the stacking direction (height direction T in this example) is lower than 100%, preferably 40% or lower, more preferably 25% or lower, and even more preferably 0%. Likewise, in the second outer interface between the first outer conductive layer 21 and the insulating layer 15*c*, the ratio of the area of the void layer 40 to that of the region of the second outer interface which overlaps the first portion 21*a* of the first outer conductive layer 21 as viewed in the stacking direction (height direction T in this example) is lower than 100%, preferably 40% or lower, more preferably 25% or lower, and even more preferably 0%.

As is seen from the foregoing description, in both of the first and second outer interfaces, the ratio of the area of the void layer 40 to that of the region of each of the first and second outer interfaces which overlaps the first portion 21*a* of the first outer conductive layer 21 as viewed in the stacking direction (height direction T in this example) is lower than 100%, preferably 40% or lower, more preferably 25% or lower, and even more preferably 0%.

In the first outer interface between the first outer conductive layer 21 and the insulating layer 15*a*, the ratio of the area of the void layer 40 to that of the region of the first outer interface which overlaps the second portion 21*b* of the first outer conductive layer 21 as viewed in the stacking direction (height direction T in this example) is preferably lower than 100%, more preferably 40% or lower, even more preferably 25% or lower, and especially preferably 0%.

Likewise, in the second outer interface between the first outer conductive layer 21 and the insulating layer 15*c*, the ratio of the area of the void layer 40 to that of the region of the second outer interface which overlaps the second portion 21*b* of the first outer conductive layer 21 as viewed in the stacking direction (height direction T in this example) is preferably lower than 100%, more preferably 40% or lower, even more preferably 25% or lower, and especially preferably 0%.

As is seen from the foregoing description, in both of the first and second outer interfaces, the ratio of the area of the void layer 40 to that of the region of each of the first and second outer interfaces which overlaps the second portion 21*b* of the first outer conductive layer 21 as viewed in the stacking direction (height direction T in this example) is preferably lower than 100%, more preferably 40% or lower, even more preferably 25% or lower, and especially preferably 0%.

The modes in the interfaces between the second outer conductive layer 22 and the corresponding insulating layers, which will be discussed below, are preferably similar to the above-described various modes in the interfaces between the first outer conductive layer 21 and the insulating layers.

The second outer conductive layer 22 may form a third outer interface with the insulating layer 15*g* that is adjacent to the second outer conductive layer 22 in the stacking direction (height direction T in this example) on the side of the first main surface 12*a* of the base body 10 and may also form a fourth outer interface with the insulating layer 15*i* that is adjacent to the second outer conductive layer 22 in the stacking direction (height direction T in this example) on the side of the second main surface 12*b* of the base body 10.

The second outer conductive layer 22 may include a first portion which overlaps a portion of the first outer electrode 31 located on the second main surface 12*b* of the base body 10 as viewed in the stacking direction (height direction T in this example).

It is preferable that, in the third outer interface between the second outer conductive layer 22 and the insulating layer 15*g*, the void layer 40 be not provided in at least part of the region of the third outer interface which overlaps the first portion of the second outer conductive layer 22 as viewed in the stacking direction (height direction T in this example).

Likewise, it is preferable that, in the fourth outer interface between the second outer conductive layer 22 and the insulating layer 15*i*, the void layer 40 be not provided in at least part of the region of the fourth outer interface which overlaps the first portion of the second outer conductive layer 22 as viewed in the stacking direction (height direction T in this example).

As is seen from the foregoing description, it is more preferable that the void layer 40 be not provided in at least part of the region of at least one of the third and fourth outer interfaces which overlaps the first portion of the second outer conductive layer 22 as viewed in the stacking direction (height direction T in this example). It is even more preferable that the void layer 40 be not provided in at least part of the region of each of the third and fourth outer interfaces which overlaps the first portion of the second outer conductive layer 22 as viewed in the stacking direction (height direction T in this example).

It is preferable that, in the third outer interface between the second outer conductive layer 22 and the insulating layer 15*g*, the void layer 40 be not provided in the entirety of the region of the third outer interface which overlaps the first portion of the second outer conductive layer 22 as viewed in the stacking direction (height direction T in this example).

Likewise, it is preferable that, in the fourth outer interface between the second outer conductive layer 22 and the insulating layer 15*i*, the void layer 40 be not provided in the entirety of the region of the fourth outer interface which overlaps the first portion of the second outer conductive layer 22 as viewed in the stacking direction (height direction T in this example).

As is seen from the foregoing description, it is more preferable that the void layer 40 be not provided in the entirety of the region of at least one of the third and fourth outer interfaces which overlaps the first portion of the second outer conductive layer 22 as viewed in the stacking direction (height direction T in this example). It is even more preferable that the void layer 40 be not provided in the entirety of the region of each of the third and fourth outer interfaces which overlaps the first portion of the second outer conductive layer 22 as viewed in the stacking direction (height direction T in this example).

The second outer conductive layer 22 may also have a second portion which overlaps a portion of the second outer electrode 32 located on the second main surface 12*b* of the base body 10 as viewed in the stacking direction (height direction T in this example).

It is preferable that, in the third outer interface between the second outer conductive layer 22 and the insulating layer 15*g*, the void layer 40 be not provided in at least part of the region of the third outer interface which overlaps the second portion of the second outer conductive layer 22 as viewed in the stacking direction (height direction T in this example).

Likewise, it is preferable that, in the fourth outer interface between the second outer conductive layer 22 and the insulating layer 15*i*, the void layer 40 be not provided in at least part of the region of the fourth outer interface which overlaps the second portion of the second outer conductive layer 22 as viewed in the stacking direction (height direction T in this example).

As is seen from the foregoing description, it is more preferable that the void layer 40 be not provided in at least part of the region of at least one of the third and fourth outer interfaces which overlaps the second portion of the second outer conductive layer 22 as viewed in the stacking direction (height direction T in this example). It is even more preferable that the void layer 40 be not provided in at least part of the region of each of the third and fourth outer interfaces which overlaps the second portion of the second outer conductive layer 22 as viewed in the stacking direction (height direction T in this example).

It is preferable that, in the third outer interface between the second outer conductive layer 22 and the insulating layer 15*g*, the void layer 40 be not provided in the entirety of the region of the third outer interface which overlaps the second portion of the second outer conductive layer 22 as viewed in the stacking direction (height direction T in this example).

Likewise, it is preferable that, in the fourth outer interface between the second outer conductive layer 22 and the insulating layer 15*i*, the void layer 40 be not provided in the entirety of the region of the fourth outer interface which overlaps the second portion of the second outer conductive layer 22 as viewed in the stacking direction (height direction T in this example).

As is seen from the foregoing description, it is more preferable that the void layer 40 be not provided in the entirety of the region of at least one of the third and fourth outer interfaces which overlaps the second portion of the second outer conductive layer 22 as viewed in the stacking direction (height direction T in this example). It is even more preferable that the void layer 40 be not provided in the entirety of the region of each of the third and fourth outer interfaces which overlaps the second portion of the second outer conductive layer 22 as viewed in the stacking direction (height direction T in this example).

It is even more preferable that, in the third outer interface between the second outer conductive layer 22 and the insulating layer 15*g*, the void layer 40 be not provided in the entirety of the regions of the third outer interface which overlap the first and second portions of the second outer conductive layer 22 as viewed in the stacking direction. It is also even more preferable that, in the fourth outer interface between the second outer conductive layer 22 and the insulating layer 15*i*, the void layer 40 be not provided in the entirety of the regions of the fourth outer interface which overlap the first and second portions of the second outer conductive layer 22 as viewed in the stacking direction.

The second outer conductive layer 22 may include first, second, and third portions. As viewed in the stacking direction (height direction T in this example), the first portion overlaps a portion of the first outer electrode 31 located on the second main surface 12*b* of the base body 10. As viewed in the stacking direction (height direction T in this example), the second portion overlaps a portion of the second outer electrode 32 located on the second main surface 12*b* of the base body 10. The third portion is a portion other than the first portion and the second portion.

The dimension from an end portion of the first outer electrode 31 to an end portion of the second outer electrode 32 in the extending direction of the third portion of the second outer conductive layer 22 is defined. It is preferable that, in the third outer interface between the second outer conductive layer 22 and the insulating layer 15*g*, the void layer 40 be not provided in the entirety of the region of the third outer interface which overlaps the first portion of the second outer conductive layer 22 as viewed in the stacking direction (height direction T in this example) and in the entirety of the region of the third outer interface which overlaps the second portion of the second outer conductive layer 22 as viewed in the stacking direction (height direction T in this example) and also that the void layer 40 be not provided in at least part of the region of the third outer interface which overlaps the third portion of the second outer conductive layer 22 as viewed in the stacking direction (height direction T in this example), and more specifically, the void layer 40 be not provided in a region of the third outer interface that overlaps the third portion as viewed in the stacking direction (height direction T in this example), the region corresponding to 20% or more of the above-described dimension.

Likewise, it is preferable that, in the fourth outer interface between the second outer conductive layer 22 and the insulating layer 15*i*, the void layer 40 be not provided in the entirety of the region of the fourth outer interface which overlaps the first portion of the second outer conductive layer 22 as viewed in the stacking direction (height direction T in this example) and in the entirety of the region of the fourth outer interface which overlaps the second portion of the second outer conductive layer 22 as viewed in the stacking direction (height direction T in this example) and also that the void layer 40 be not provided in at least part of the region of the fourth outer interface which overlaps the third portion of the second outer conductive layer 22 as viewed in the stacking direction (height direction T in this example), and more specifically, the void layer 40 be not provided in the region of the fourth outer interface that overlaps the third portion as viewed in the stacking direction (height direction T in this example), the region corresponding to 20% or more of the above-described dimension.

As is seen from the foregoing description, it is more preferable that the void layer 40 be not provided in the entirety of the region of at least one of the third and fourth outer interfaces which overlaps the first portion of the second outer conductive layer 22 as viewed in the stacking direction (height direction T in this example) and in the entirety of the region of at least one of the third and fourth outer interfaces which overlaps the second portion of the second outer conductive layer 22 as viewed in the stacking direction (height direction T in this example) and also that the void layer 40 be not provided in at least part of the region of at least one of the third and fourth outer interfaces which overlaps the third portion of the second outer conductive layer 22 as viewed in the stacking direction (height direction T in this example), and more specifically, the void layer 40 be not provided in the region of at least one of the third and fourth outer interfaces that overlaps the third portion as viewed in the stacking direction (height direction T in this example), the region corresponding to 20% or more of the above-described dimension. It is even more preferable that the void layer 40 be not provided in the entirety of the regions of both of the third and fourth outer interfaces which overlap the first portion of the second outer conductive layer 22 as viewed in the stacking direction (height direction T in this example) and in the entirety of the regions of both of the third and fourth outer interfaces which overlap the second portion of the second outer conductive layer 22 as viewed in the stacking direction (height direction T in this example) and also that the void layer 40 be not provided in at least part of the region of each of the third and fourth outer interfaces which overlaps the third portion of the second outer conductive layer 22 as viewed in the stacking direction (height direction T in this example), and more specifically, the void layer 40 be not provided in a region of each of the third and fourth outer interfaces that overlaps the third portion as viewed in the stacking direction (height direction T in this example), the region corresponding to 20% or more of the above-described dimension.

It is preferable that the void layer 40 be not provided in the entirety of the third outer interface between the second outer conductive layer 22 and the insulating layer 15*g*.

Likewise, it is preferable that the void layer 40 be not provided in the entirety of the fourth outer interface between the second outer conductive layer 22 and the insulating layer 15*i*.

As is seen from the foregoing description, it is more preferable that the void layer 40 be not provided in the entirety of at least one of the third and fourth outer interfaces. It is even more preferable that the void layer 40 be not provided in the entirety of both of the third and fourth outer interfaces.

The ratio of the area of the void layer 40 to that of the second outer conductive layer 22 in the third outer interface between the second outer conductive layer 22 and the insulating layer 15*g* is preferably lower than the ratio of the area of the void layer 40 to that of the inner conductive layer in at least one inner interface (the first inner interface between the inner conductive layer 23*b* and the insulating layer 15*e*, for example) among all the first and second inner interfaces between the inner conductive layers and the insulating layers.

The ratio of the area of the void layer 40 to that of the second outer conductive layer 22 in the third outer interface between the second outer conductive layer 22 and the insulating layer 15*g* is preferably lower than 100%, more preferably 50% or lower, and even more preferably 0%.

Likewise, the ratio of the area of the void layer 40 to that of the second outer conductive layer 22 in the fourth outer interface between the second outer conductive layer 22 and the insulating layer 15*i* is preferably lower than the ratio of the area of the void layer 40 to that of the inner conductive layer in at least one inner interface (the first inner interface between the inner conductive layer 23*b* and the insulating layer 15*e*, for example) among all the first and second inner interfaces between the inner conductive layers and the insulating layers.

The ratio of the area of the void layer 40 to that of the second outer conductive layer 22 in the fourth outer interface between the second outer conductive layer 22 and the insulating layer 15*i* is preferably lower than 100%, more preferably 50% or lower, and even more preferably 0%.

As is seen from the foregoing description, the ratio of the area of the void layer 40 to that of the second outer conductive layer 22 in at least one of the third and fourth outer interfaces is preferably lower than the ratio of the area of the void layer 40 to that of the inner conductive layer in at least one inner interface (the first inner interface between the inner conductive layer 23*b* and the insulating layer 15*e*, for example) among all the first and second inner interfaces. More preferably, the ratio of the area of the void layer 40 to that of the second outer conductive layer 22 in both of the third and fourth outer interfaces is lower than the ratio of the area of the void layer 40 to that of the inner conductive layer in at least one inner interface (the first inner interface between the inner conductive layer 23*b* and the insulating layer 15*e*, for example) among all the first and second inner interfaces. Even more preferably, the ratio of the area of the void layer 40 to that of the second outer conductive layer 22 in both of the third and fourth outer interfaces is lower than the ratio of the area of the void layer 40 to that of the inner conductive layer in all the first and second inner interfaces.

In the third outer interface between the second outer conductive layer 22 and the insulating layer 15*g*, the ratio of the area of the void layer 40 to that of the region of the third outer interface which overlaps the first portion of the second outer conductive layer 22 as viewed in the stacking direction (height direction T in this example) is preferably lower than 100%, more preferably 40% or lower, even more preferably 25% or lower, and especially preferably 0%.

Likewise, in the fourth outer interface between the second outer conductive layer 22 and the insulating layer 15*i*, the ratio of the area of the void layer 40 to that of the region of the fourth outer interface which overlaps the first portion of the second outer conductive layer 22 as viewed in the stacking direction (height direction T in this example) is preferably lower than 100%, more preferably 40% or lower, even more preferably 25% or lower, and especially preferably 0%.

As is seen from the foregoing description, in both of the third and fourth outer interfaces, the ratio of the area of the void layer 40 to that of the region of each of the third and fourth outer interfaces which overlaps the first portion of the second outer conductive layer 22 as viewed in the stacking direction (height direction T in this example) is preferably lower than 100%, more preferably 40% or lower, even more preferably 25% or lower, and especially preferably 0%.

In the third outer interface between the second outer conductive layer 22 and the insulating layer 15*g*, the ratio of the area of the void layer 40 to that of the region of the third outer interface which overlaps the second portion of the second outer conductive layer 22 as viewed in the stacking direction (height direction T in this example) is preferably lower than 100%, more preferably 40% or lower, even more preferably 25% or lower, and especially preferably 0%.

Likewise, in the fourth outer interface between the second outer conductive layer 22 and the insulating layer 15*i*, the ratio of the area of the void layer 40 to that of the region of the fourth outer interface which overlaps the second portion of the second outer conductive layer 22 as viewed in the stacking direction (height direction T in this example) is preferably lower than 100%, more preferably 40% or lower, even more preferably 25% or lower, and especially preferably 0%.

As is seen from the foregoing description, in both of the third and fourth outer interfaces, the ratio of the area of the void layer 40 to that of the region of each of the third and fourth outer interfaces which overlaps the second portion of the second outer conductive layer 22 as viewed in the stacking direction (height direction T in this example) is preferably lower than 100%, more preferably 40% or lower, even more preferably 25% or lower, and especially preferably 0%.

The multilayer coil component 1 is manufactured by the following method, for example.

Preparing Step of Magnetic Ferrite Paste

First, $Fe_2O_3$, ZnO, CuO, and NiO are weighed to have a predetermined composition. In this case, additives, such as Mn, Co, Sn, Bi, and Si, may be added. Then, the weighed substances are mixed and ground in a wet process. The ground substances are dried and are then calcined. The calcining temperature is 700° C. to 800° C., for example. As a result, a powdered magnetic ferrite material is prepared.

The composition of the magnetic ferrite material is preferably as follows: assuming that the total amount of the magnetic ferrite material is 100 mol %, Fe contains 40 mol % to 49.5 mol % in terms of $Fe_2O_3$, Zn contains 5 mol % to 35 mol % in terms of ZnO, Cu contains 4 mol % to 12 mol % in terms of CuO, and Ni composes the balance in terms of NiO.

Then, predetermined amounts of solvent, such as ketone solvent, resin, such as polyvinyl acetal, and plasticizer, such as alkyd plasticizer, for example, are added to the magnetic ferrite material. The resulting mixture is kneaded in a machine, such as a planetary mixer, and is then dispersed with a three roll mill, for example. As a result, a magnetic ferrite paste is prepared.

Preparing Step of Non-Magnetic Ferrite Paste

First, $Fe_2O_3$, CuO, and ZnO are weighed to have a predetermined composition. In this case, additives, such as Mn, Co, Sn, Bi, and Si, may be added. Then, the weighed substances are mixed and ground in a wet process. The ground substances are dried and are then calcined. The calcining temperature is 700° C. to 800° C., for example. As a result, a powdered non-magnetic ferrite material is prepared.

The composition of the non-magnetic ferrite material is preferably as follows: assuming that the total amount of the non-magnetic ferrite material is 100 mol %, Fe contains 40 mol % to 49.5 mol % in terms of $Fe_2O_3$, Cu contains 6 mol % to 12 mol % in terms of CuO, and Zn composes the balance in terms of ZnO.

Then, predetermined amounts of solvent, such as ketone solvent, resin, such as polyvinyl acetal, and plasticizer, such as alkyd plasticizer, for example, are added to the non-magnetic ferrite material. The resulting mixture is kneaded in a machine, such as a planetary mixer, and is then dispersed with a three roll mill, for example. As a result, a non-magnetic ferrite paste is prepared.

Preparing Step of Resin Paste

Resin, such as an acrylic resin, is mixed into a solvent, such as dihydroterpinyl acetate, thereby preparing a resin paste.

Preparing Step of Conductive Paste

Predetermined amounts of solvent, such as eugenol, resin, such as ethyl cellulose, and dispersant, for example, are added to Ag powder. The resulting mixture is kneaded in a machine, such as a planetary mixer, and is then dispersed with a three roll mill, for example. As a result, a conductive paste is prepared.

Forming Step of Multilayer Body Block

FIGS. 5 through 24 are schematic plan views for explaining the individual steps of forming a multilayer body block in an example of the manufacturing method for a multilayer coil component of an embodiment of the disclosure.

A substrate (not shown) having a heat release sheet and a polyethylene terephthalate (PET) film stacked on the surface of a metal plate in this order is prepared. Then, the magnetic ferrite paste is applied onto the substrate, thereby forming a magnetic ferrite paste layer 115*a* such as that shown in FIG. 5. The magnetic ferrite paste layer 115*a* forms the insulating layer 15*a* in the multilayer coil component 1 after a firing step, which will be discussed later.

Figure 6:
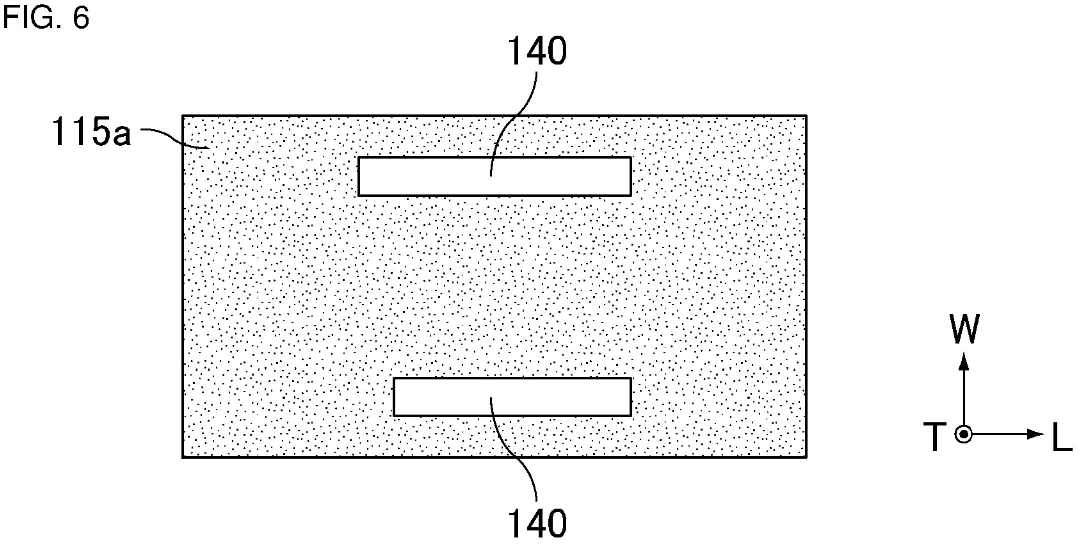
FIG. 6 is a schematic plan view for explaining a step of forming the multilayer body block.

The resin paste is applied onto predetermined portions of the magnetic ferrite paste layer 115*a*, thereby forming a resin paste layer 140 such as that shown in FIG. 6. The resin paste layer 140 shown in FIG. 6 forms the void layer 40 provided in the first outer interface between the first outer conductive layer 21 and the insulating layer 15*a* in the multilayer coil component 1 after the firing step, which will be discussed later.

Figure 7:
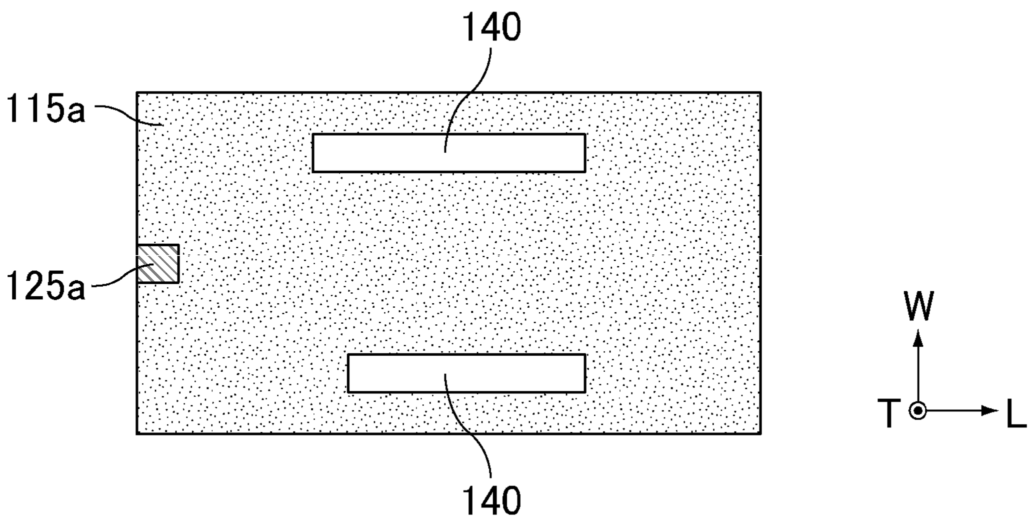
FIG. 7 is a schematic plan view for explaining a step of forming the multilayer body block.

The conductive paste is applied onto a predetermined portion of the magnetic ferrite paste layer 115*a*, thereby forming a conductive paste layer 125*a* such as that shown in FIG. 7. The conductive paste layer 125*a* forms part of the first extending conductor 25*a* in the multilayer coil component 1 after the firing step, which will be discussed later. Forming the conductive paste layer 125*a* in advance can make the thickness of the first extending conductor 25*a* thicker than that of the portion of the first outer conductive layer 21 other than the first extending conductor 25*a* in the multilayer coil component 1. In the multilayer coil component 1, if the first extending conductor 25*a* is formed thick in this manner, it is likely to improve the sealing properties of the multilayer coil component 1.

Figure 8:
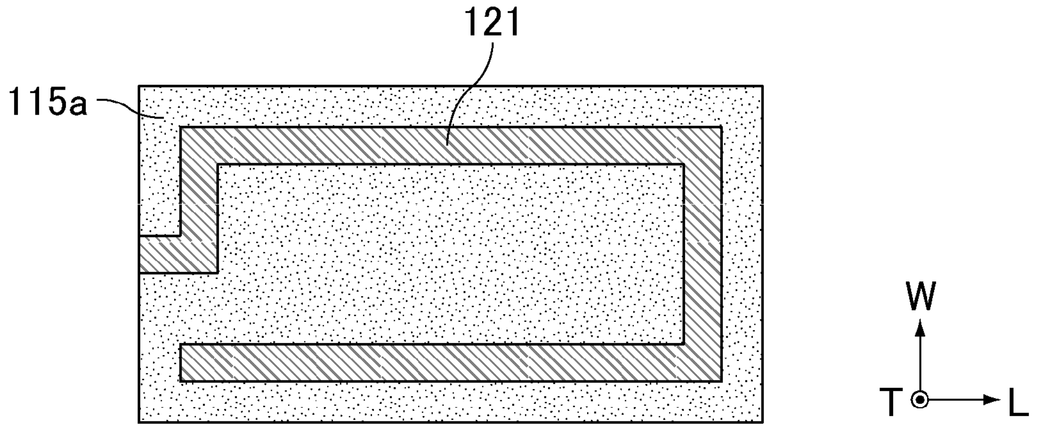
FIG. 8 is a schematic plan view for explaining a step of forming the multilayer body block.

The conductive paste is applied onto part of the magnetic ferrite paste layer 115*a*, the conductive paste layer 125*a*, and the resin paste layer 140, thereby forming a conductive paste layer 121 such as that shown in FIG. 8. Part of the conductive paste layer 121 forms the first outer conductive layer 21 in the multilayer coil component 1 after the firing step, which will be discussed later.

Figure 9:
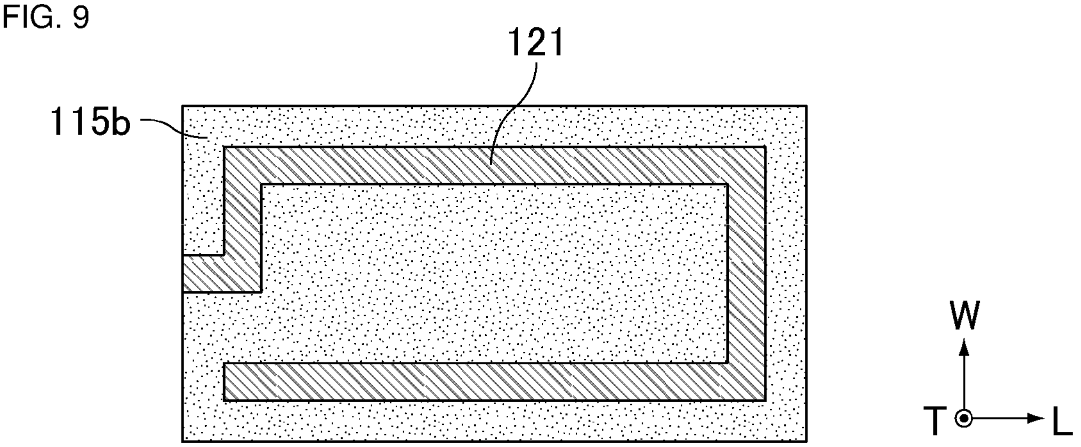
FIG. 9 is a schematic plan view for explaining a step of forming the multilayer body block.

The magnetic ferrite paste is applied onto the region of the magnetic ferrite paste layer 115*a* where the conductive paste layer 121 is not formed, thereby forming a magnetic ferrite paste layer 115*b* such as that shown in FIG. 9. Preferably, the magnetic ferrite paste layer 115*b* is formed to have substantially the same thickness as that of the conductive paste layer 121. The magnetic ferrite paste layer 115*b* forms the insulating layer 15*b* in the multilayer coil component 1 after the firing step, which will be discussed later.

Figure 10:
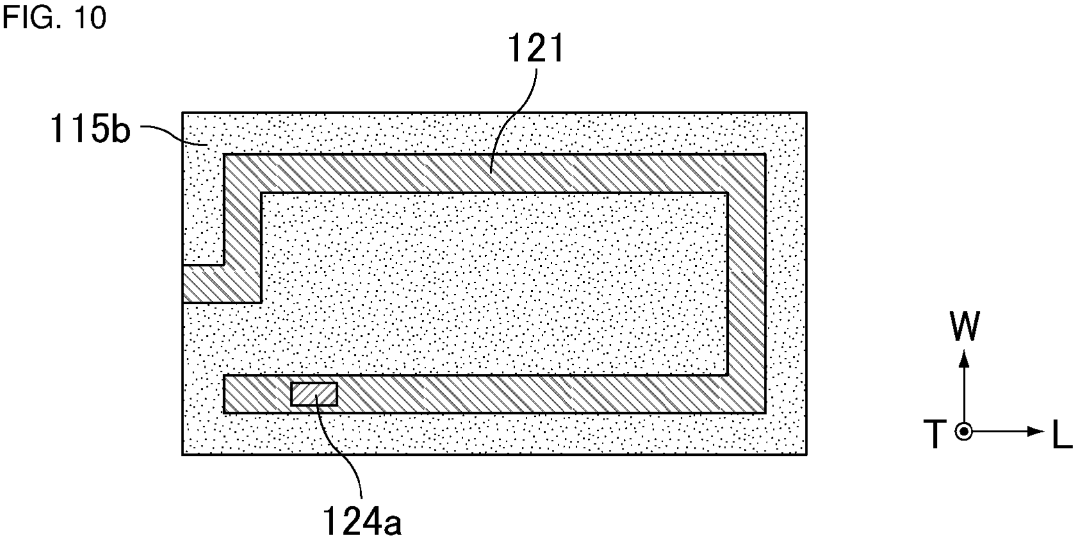
FIG. 10 is a schematic plan view for explaining a step of forming the multilayer body block.

The conductive paste is applied onto the vicinity of the leading end of the conductive paste layer 121 opposite the conductive paste layer 125*a* (see FIG. 7) of the conductive paste layer 121. As a result, a conductive paste layer 124*a* such as that shown in FIG. 10 is formed. Preferably, the conductive paste layer 124*a* is formed to have a smaller dimension than the conductive paste layer 121 in the direction perpendicular to the extending direction of the conductive paste layer 121. The conductive paste layer 124*a* forms the connecting conductor 24*a* in the multilayer coil component 1 after the firing step, which will be discussed later.

Figure 11:
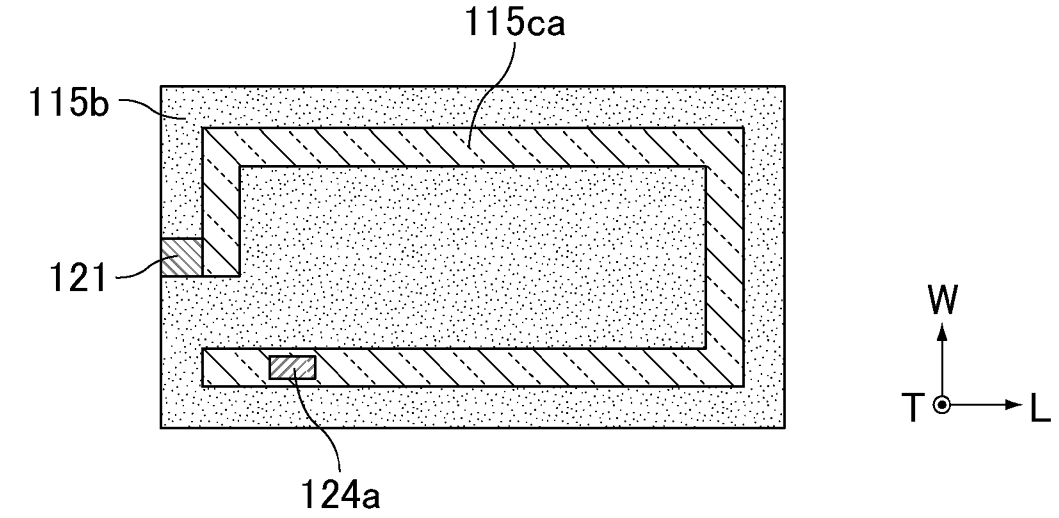
FIG. 11 is a schematic plan view for explaining a step of forming the multilayer body block.

The non-magnetic ferrite paste is applied onto part of the conductive paste layer 121, thereby forming a non-magnetic ferrite paste layer 115*ca* such as that shown in FIG. 11. The non-magnetic ferrite paste layer 115*ca* is formed so that a cavity is provided at a position at which the conductive paste layer 124*a* is formed. The non-magnetic ferrite paste layer 115*ca* forms part of the insulating layer 15*c* in the multilayer coil component 1 after the firing step, which will be discussed later. In the multilayer coil component 1, if the insulating layer (insulating layer 15*c* in this example) between conductive layers forming the coil 20 contains a non-magnetic ferrite material in this manner, magnetic saturation is less likely to occur in the multilayer coil component 1, thereby making it likely to improve the DC superimposing characteristics of the multilayer coil component 1.

Figure 12:
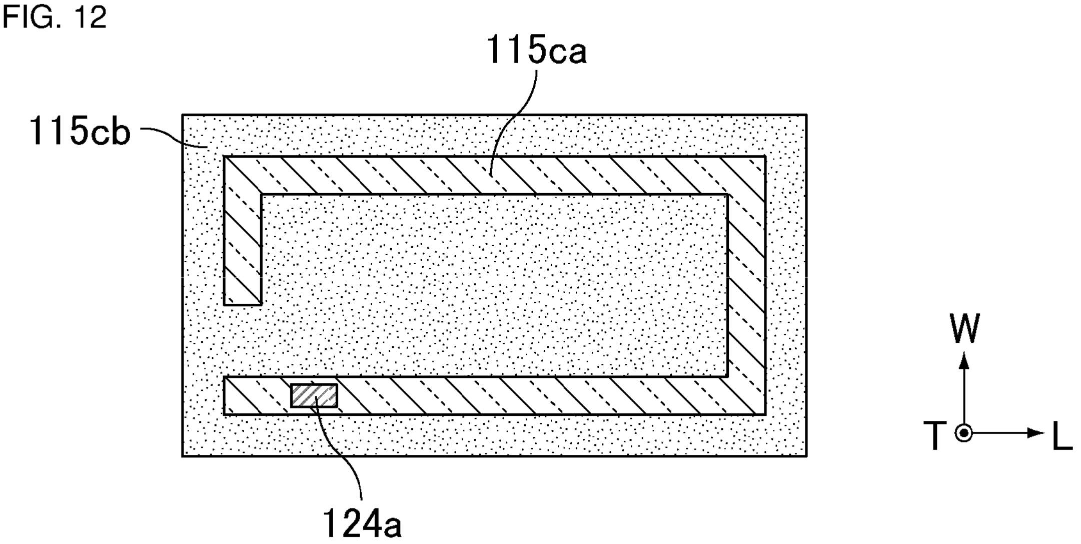
FIG. 12 is a schematic plan view for explaining a step of forming the multilayer body block.

The magnetic ferrite paste is applied onto the region of the magnetic ferrite paste layer 115*b* where the non-magnetic ferrite paste layer 115*ca* and the conductive paste layer 124*a* are not formed, thereby forming a magnetic ferrite paste layer 115*cb* such as that shown in FIG. 12. As in the non-magnetic ferrite paste layer 115*ca*, the magnetic ferrite paste layer 115*cb* forms part of the insulating layer 15*c* in the multilayer coil component 1 after the firing step, which will be discussed later.

Figure 13:
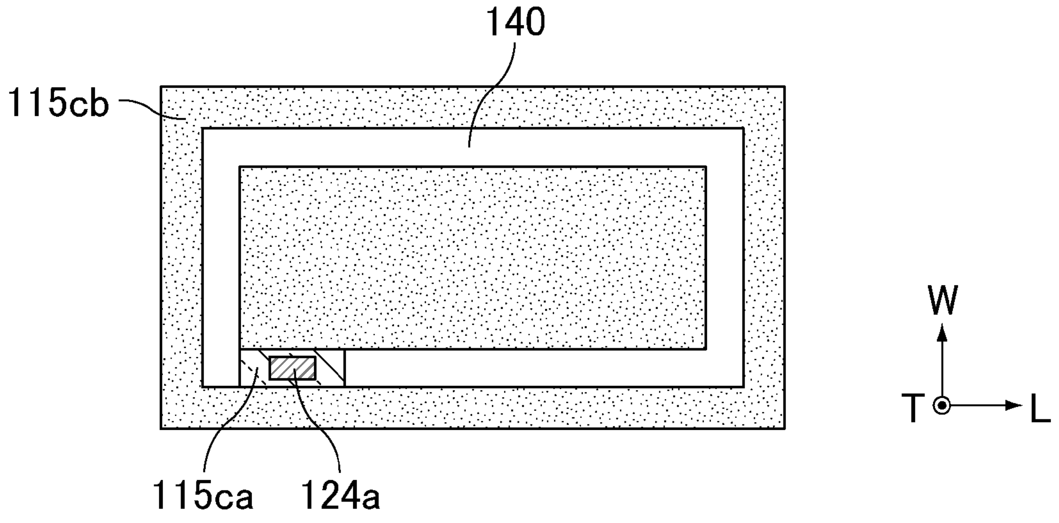
FIG. 13 is a schematic plan view for explaining a step of forming the multilayer body block.

The resin paste is applied onto a predetermined portion, which is part of the non-magnetic ferrite paste layer 115*ca*, and onto a predetermined portion, which is part of the magnetic ferrite paste layer 115*cb*, thereby forming a resin paste layer 140 such as that shown in FIG. 13. The resin paste layer 140 shown in FIG. 13 forms the void layer 40 to be provided in the first inner interface between the inner conductive layer 23*a* and the insulating layer 15*c* in the multilayer coil component 1 after the firing step, which will be discussed later.

Figure 14:
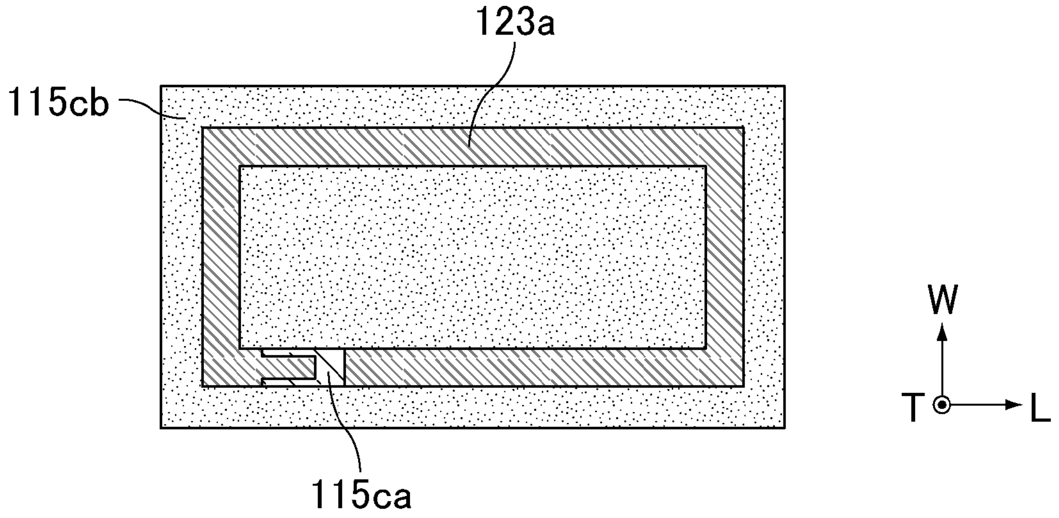
FIG. 14 is a schematic plan view for explaining a step of forming the multilayer body block.

The conductive paste is applied onto part of the non-magnetic ferrite paste layer 115*ca*, the conductive paste layer 124*a*, and the resin paste layer 140, thereby forming a conductive paste layer 123*a* such as that shown in FIG. 14. After this step, the conductive paste layer 121 and the conductive paste layer 123*a* are electrically connected to each other via the conductive paste layer 124*a*. Preferably, the conductive paste layer 123*a* is formed so that the portion (included in a land) of the conductive paste layer 123*a* to connect to the conductive paste layer 124*a* has substantially the same dimension as the conductive paste layer 124*a* in the direction perpendicular to the extending direction of the conductive paste layer 123*a*. That is, it is preferable that, in the direction perpendicular to the extending direction of the conductive paste layer 123*a*, the dimension of the portion (included in a land) of the conductive paste layer 123*a* to connect to the conductive paste layer 124*a* be substantially the same as that of the conductive paste layer 124*a* and be smaller than that of the conductive paste layer 121. The conductive paste layer 123*a* forms the inner conductive layer 23*a* in the multilayer coil component 1 after the firing step, which will be discussed later.

Figure 15:
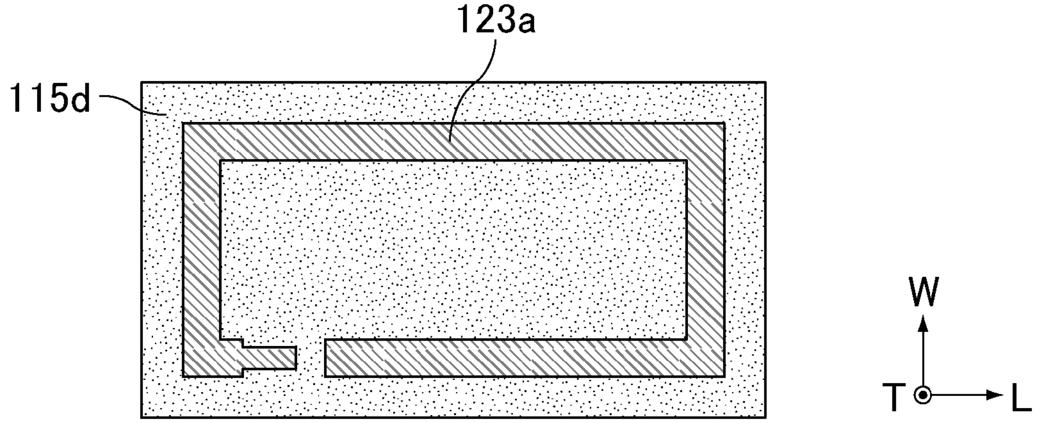
FIG. 15 is a schematic plan view for explaining a step of forming the multilayer body block.

The magnetic ferrite paste is applied onto the region where the conductive paste layer 123*a* is not formed, thereby forming a magnetic ferrite paste layer 115*d* such as that shown in FIG. 15. The magnetic ferrite paste layer 115*d* forms the insulating layer 15*d* in the multilayer coil component 1 after the firing step, which will be discussed later.

Thereafter, steps similar to the above-described steps are repeated. Hereinafter, the final steps followed by the above-described steps to form a multilayer body block will be explained. Although several steps are conducted between the step shown in FIG. 15 and that shown in FIG. 16, which will be discussed below, an explanation thereof is omitted.

Figure 16:
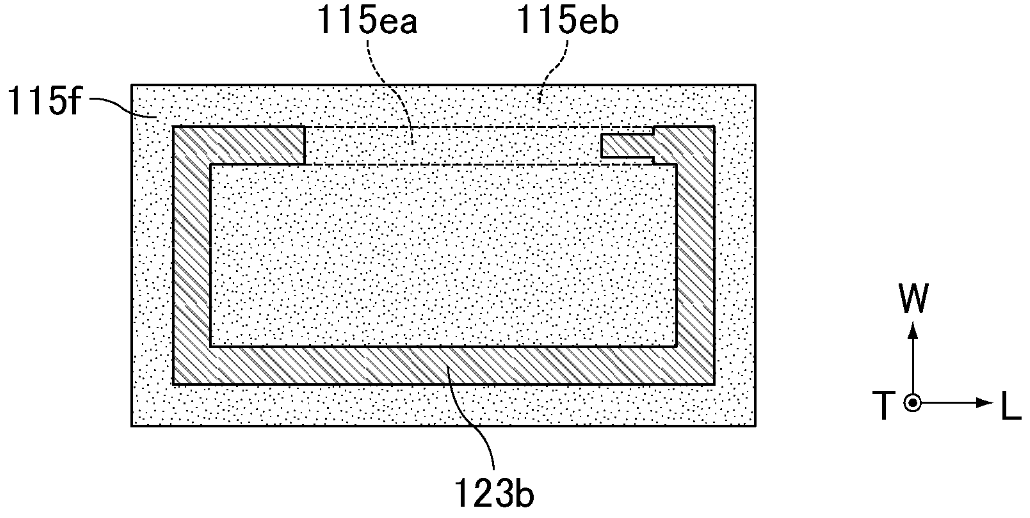
FIG. 16 is a schematic plan view for explaining a step of forming the multilayer body block.

The magnetic ferrite paste is applied onto the region where a conductive paste layer 123*b* is not formed, thereby forming a magnetic ferrite paste layer 115*f* such as that shown in FIG. 16. The magnetic ferrite paste layer 115*f* forms the insulating layer 15*f* in the multilayer coil component 1 after the firing step, which will be discussed later. The conductive paste layer 123*b* forms the inner conductive layer 23*b* in the multilayer coil component 1 after the firing step, which will be discussed later. Anon-magnetic ferrite paste layer 115*ea* and a magnetic ferrite paste layer 115*eb* disposed under the magnetic ferrite paste layer 115*f* each form part of the insulating layer 15*e* in the multilayer coil component 1 after the firing step, which will be discussed later.

Figure 17:
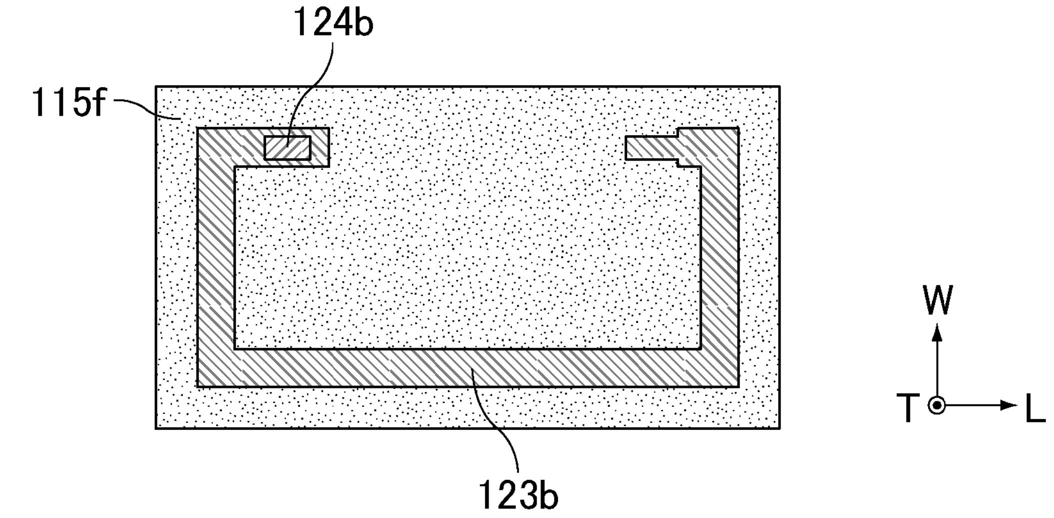
FIG. 17 is a schematic plan view for explaining a step of forming the multilayer body block.

The conductive paste is applied onto the vicinity of one end of the conductive paste layer 123*b*, thereby forming a conductive paste layer 124*b* such as that shown in FIG. 17. The conductive paste layer 124*b* forms the connecting conductor 24*b* in the multilayer coil component 1 after the firing step, which will be discussed later.

Figure 18:
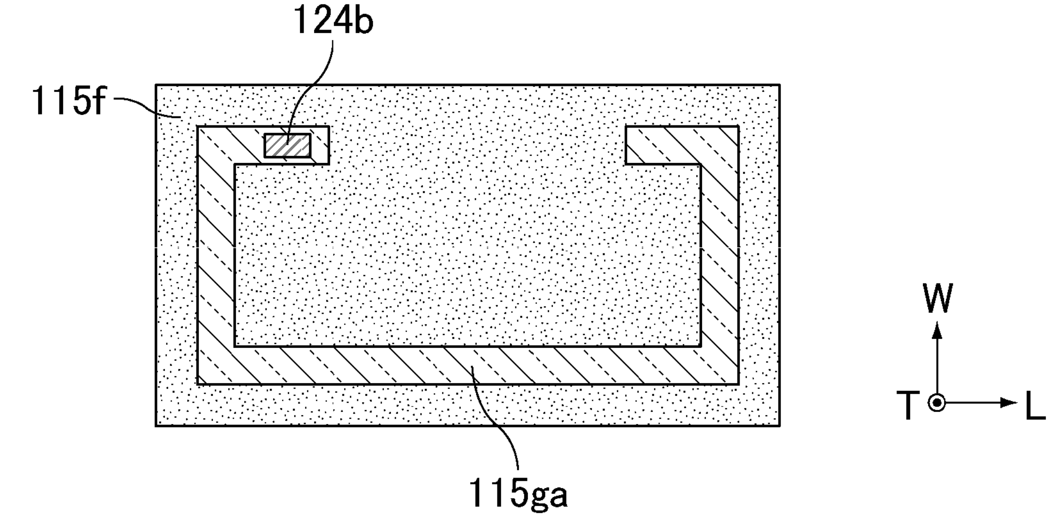
FIG. 18 is a schematic plan view for explaining a step of forming the multilayer body block.

The non-magnetic ferrite paste is applied onto part of the magnetic ferrite paste layer 115*f* and the conductive paste layer 123*b*, thereby forming a non-magnetic ferrite paste layer 115*ga* such as that shown in FIG. 18. The non-magnetic ferrite paste layer 115*ga* is formed so that a cavity is provided at a position at which the conductive paste layer 124*b* is formed. The non-magnetic ferrite paste layer 115*ga* forms part of the insulating layer 15*g* in the multilayer coil component 1 after the firing step, which will be discussed later.

Figure 19:
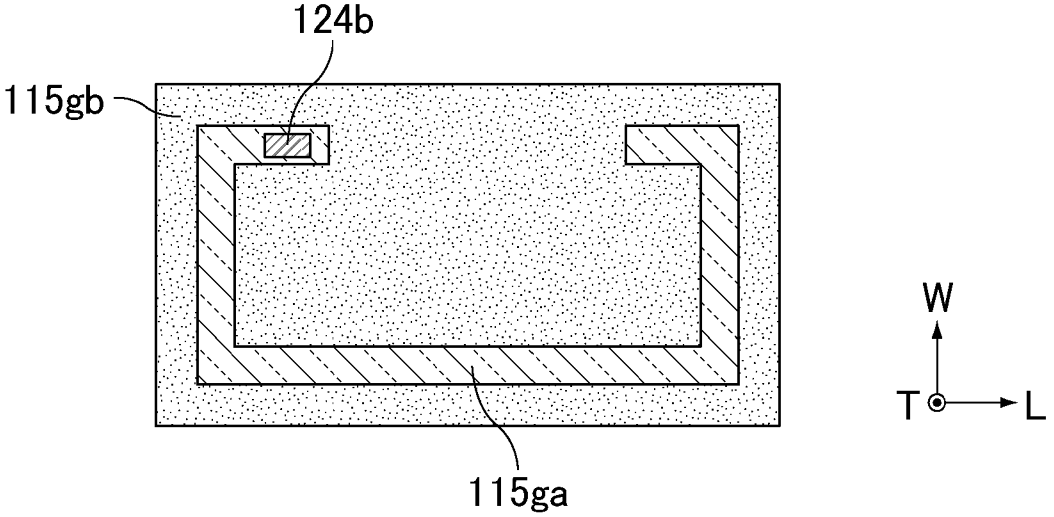
FIG. 19 is a schematic plan view for explaining a step of forming the multilayer body block.

The magnetic ferrite paste is applied onto the region of the magnetic ferrite paste layer 115*f* where the non-magnetic ferrite paste layer 115*ga* and the conductive paste layer 124*b* are not formed, thereby forming a magnetic ferrite paste layer 115*gb* such as that shown in FIG. 19. As in the non-magnetic ferrite paste layer 115*ga*, the magnetic ferrite paste layer 115*gb* shown in FIG. 19 forms part of the insulating layer 15*g* in the multilayer coil component 1 after the firing step, which will be discussed later.

Figure 20:
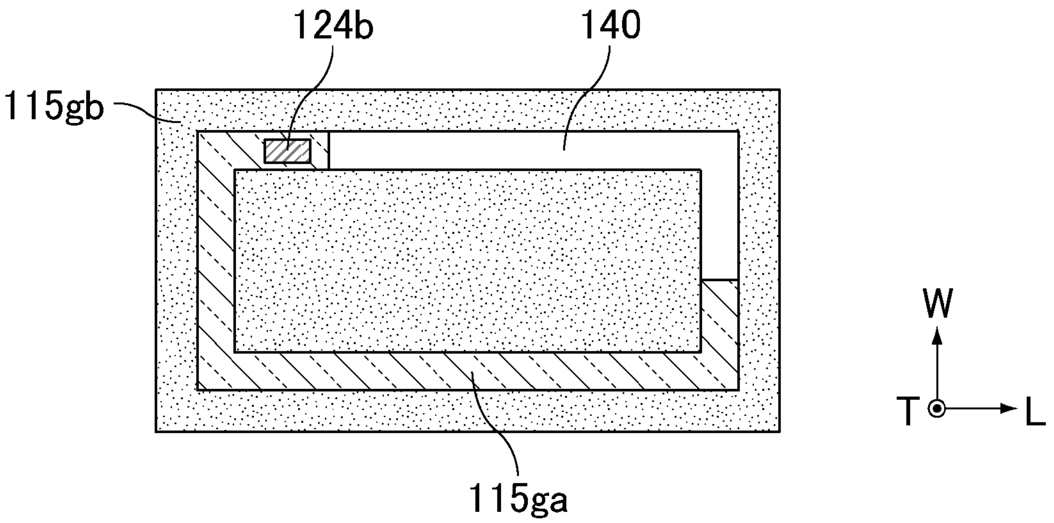
FIG. 20 is a schematic plan view for explaining a step of forming the multilayer body block.

The resin paste is applied onto a predetermined portion, which is part of the non-magnetic ferrite paste layer 115*ga*, and onto a predetermined portion, which is part of the magnetic ferrite paste layer 115*gb*, thereby forming a resin paste layer 140 such as that shown in FIG. 20. The resin paste layer 140 shown in FIG. 20 forms the void layer 40 to be provided in the third outer interface between the second outer conductive layer 22 and the insulating layer 15*g* in the multilayer coil component 1 after the firing step, which will be discussed later.

Figure 21:
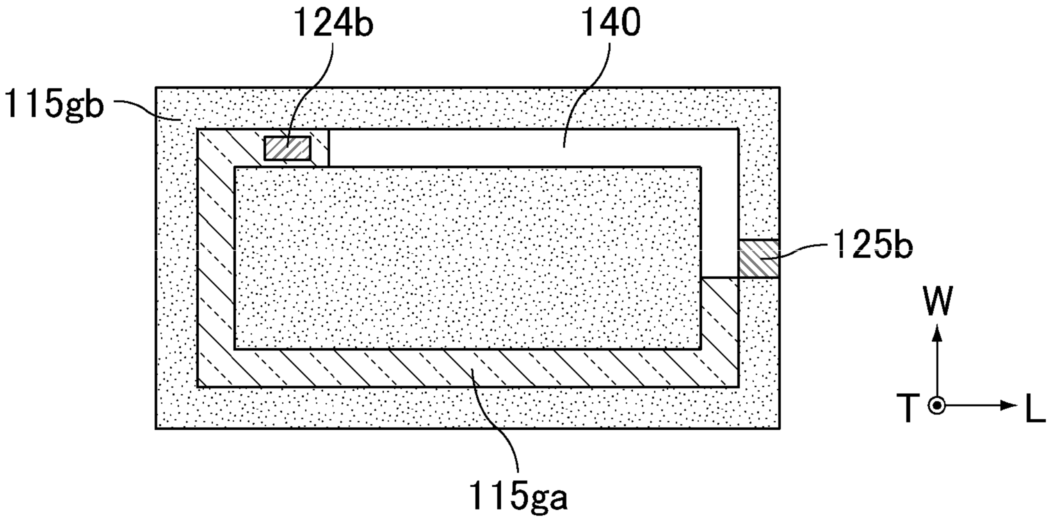
FIG. 21 is a schematic plan view for explaining a step of forming the multilayer body block.

The conductive paste is applied onto a predetermined portion of the magnetic ferrite paste layer 115*gb*, thereby forming a conductive paste layer 125*b* such as that shown in FIG. 21. The conductive paste layer 125*b* forms part of the second extending conductor 25*b* in the multilayer coil component 1 after the firing step, which will be discussed later. Forming the conductive paste layer 125*b* in advance can make the thickness of the second extending conductor 25*b* thicker than that of the portion of the second outer conductive layer 22 other than the second extending conductor 25*b* in the multilayer coil component 1. In the multilayer coil component 1, if the second extending conductor 25*b* is formed thick in this manner, it is likely to improve the sealing properties of the multilayer coil component 1.

Figure 22:
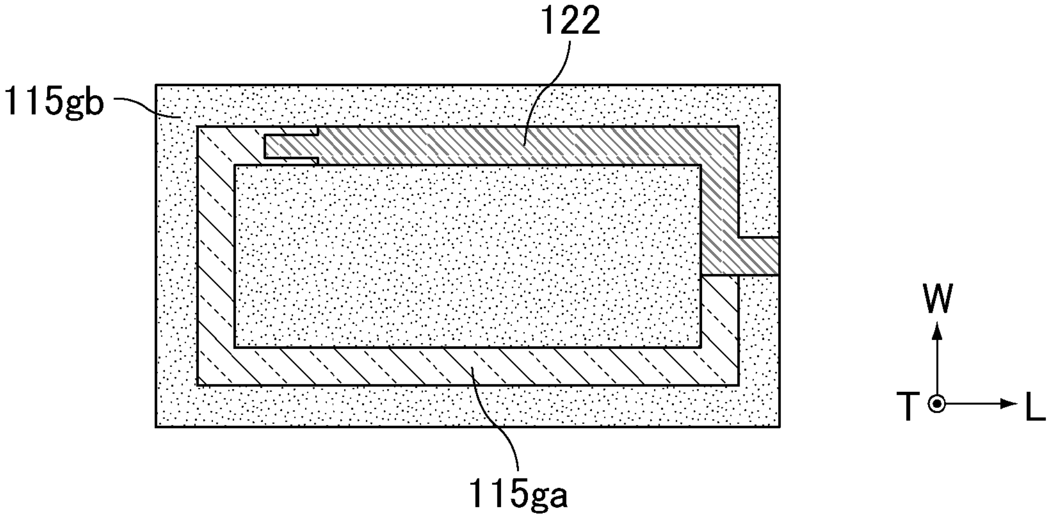
FIG. 22 is a schematic plan view for explaining a step of forming the multilayer body block.

The conductive paste is applied onto part of the non-magnetic ferrite paste layer 115*ga*, the conductive paste layer 124*b*, the conductive paste layer 125*b*, and the resin paste layer 140, thereby forming a conductive paste layer 122 such as that shown in FIG. 22. After this step, the conductive paste layer 122 and the conductive paste layer 123*b* are electrically connected to each other via the conductive paste layer 124*b*. Preferably, the conductive paste layer 122 is formed so that the portion (included in a land) of the conductive paste layer 122 to connect to the conductive paste layer 124*b* has substantially the same dimension as the conductive paste layer 124*b* in the direction perpendicular to the extending direction of the conductive paste layer 122. Part of the conductive paste layer 122 forms the second outer conductive layer 22 in the multilayer coil component 1 after the firing step, which will be discussed later.

Figure 23:
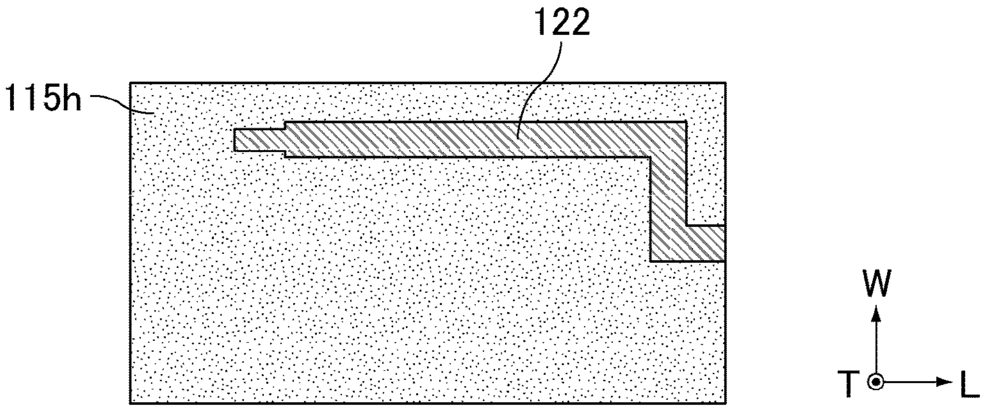
FIG. 23 is a schematic plan view for explaining a step of forming the multilayer body block.

The magnetic ferrite paste is applied onto a region where the conductive paste layer 122 is not formed, thereby forming a magnetic ferrite paste layer 115*h* such as that shown in FIG. 23. Preferably, the magnetic ferrite paste layer 115*h* is formed to have substantially the same thickness as that of the conductive paste layer 122. The magnetic ferrite paste layer 115*h* forms the insulating layer 15*h* in the multilayer coil component 1 after the firing step, which will be discussed later.

Figure 24:
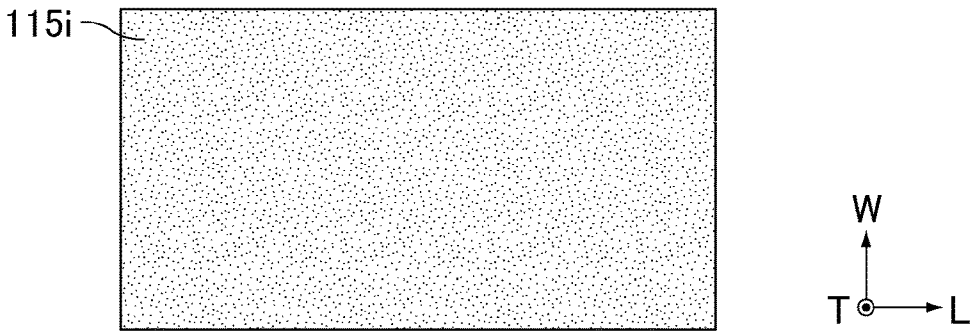
FIG. 24 is a schematic plan view for explaining a step of forming the multilayer body block.

The magnetic ferrite paste is applied onto the magnetic ferrite paste layer 115*h* and the conductive paste layer 122, thereby forming a magnetic ferrite paste layer 115*i* such as that shown in FIG. 24. The magnetic ferrite paste layer 115*i* forms the insulating layer 15*i* in the multilayer coil component 1 after the firing step, which will be discussed later.

After the above-described steps, a multilayer body block is formed in which multiple conductive paste layers and resin layers are provided inside a multilayer body constituted by multiple magnetic ferrite paste layers and non-magnetic ferrite paste layers stacked on each other.

(Step of Forming Base Body and Coil)

First, the multilayer body block is cut into a predetermined size with a dicer, for example, thereby forming individual chips. Then, each chip is fired.

After firing the chip, as discussed above, the magnetic ferrite paste layers and non-magnetic ferrite paste layers are formed into insulating layers (such as the insulating layer 15*a*), the conductive paste layers are formed into conductive layers (such as the first and second outer conductive layers 21 and 22 and inner conductive layers 23*a* and 23*b*) and into conductors (such as the connecting conductors 24*a* and 24*b* and first and second extending conductors 25*a* and 25*b*), and the resin paste layers are formed into void layers (such as the void layers 40).

As a result, the base body 10 and the coil 20 such as those shown in FIGS. 2 and 3 are formed. The base body 10 is constituted by multiple insulating layers stacked on each other in the stacking direction (height direction T in this example). The coil 20 is disposed inside the base body 10 and is constituted by multiple conductive layers which are stacked on each other in the stacking direction (height direction T in this example) and which are electrically connected to each other via the connecting conductors. The first extending conductor 25*a* is exposed at the first end surface 11*a* of the base body 10, while the second extending conductor 25*b* is exposed at the second end surface 11*b* of the base body 10.

The corners and ridges of the base body 10 may be rounded as a result of the base body 10 being placed in a rotary barrel polisher with media and being subjected to barrel polishing.

Step of Forming Outer Electrodes

A conductive paste, such as a paste containing Ag and glass frit, is applied to a region from the first end surface 11*a* of the base body 10 to part of each of the first main surface 12*a*, second main surface 12*b*, first side surface 13*a*, second side surface 13*b*. As a result, a first coating film is formed in the region extending from the first end surface 11*a* to part of each of the first and second main surfaces 12*a* and 12*b* and the first and second side surfaces 13*a* and 13*b* so as to connect to the first extending conductor 25*a* exposed at the first end surface 11*a* of the base body 10.

A conductive paste, such as a paste containing Ag and glass frit, is applied to a region from the second end surface 11*b* of the base body 10 to part of each of the first main surface 12*a*, second main surface 12*b*, first side surface 13*a*, second side surface 13*b*. As a result, a second coating film is formed in the region extending from the second end surface 11*b* to part of each of the first and second main surfaces 12*a* and 12*b* and the first and second side surfaces 13*a* and 13*b* so as to connect to the second extending conductor 25*b* exposed at the second end surface 11*b* of the base body 10.

In this manner, the first and second coating films are formed at positions separated from each other (separated in the length direction L in this example) on the surfaces of the base body 10.

The first and second coating films may be formed at the same timing or at different timings.

If the first and second coating films are formed at different timings, they may be formed in order of the first coating film and the second coating film or in a reverse order.

Then, the first coating film is burned, so that a first underlying electrode is formed to extend from the first end surface 11*a* of the base body 10 to part of each of the first and second main surfaces 12*a* and 12*b* and the first and second side surfaces 13*a* and 13*b* and to connect to the first extending conductor 25*a*.

The second coating film is burned, so that a second underlying electrode is formed to extend from the second end surface 11*b* of the base body 10 to part of each of the first and second main surfaces 12*a* and 12*b* and the first and second side surfaces 13*a* and 13*b* and to connect to the second extending conductor 25*b*.

Then, a Ni-plated electrode and a Sn-plated electrode are formed in this order on the surface of the first underlying electrode by electrolytic plating, for example. As a result, an outer electrode including the first underlying electrode, Ni-plated electrode, and Sn-plated electrode disposed in this order on the surface of the base body 10 is formed as an example of the first outer electrode 31.

A Ni-plated electrode and a Sn-plated electrode are formed in this order on the surface of the second underlying electrode by electrolytic plating, for example. As a result, an outer electrode including the second underlying electrode, Ni-plated electrode, and Sn-plated electrode disposed in this order on the surface of the base body 10 is formed as an example of the second outer electrode 32.

In this manner, the first outer electrode 31 electrically connected to the coil 20 via the first extending conductor 25*a* and the second outer electrode 32 electrically connected to the coil 20 via the second extending conductor 25*b* are formed on surfaces of the base body 10, more specifically, at least on the first main surface 12*a* of the base body 10.

As a result, the multilayer coil component 1 is manufactured.

In the multilayer coil component 1, both of the first and second outer conductive layers 21 and 22 form the coil 20, together with inner conductive layers including the inner conductive layers 23*a* and 23*b*. It is possible, however, that at least one of the first and second outer conductive layers 21 and 22 does not form the coil 20. In other words, conductive layers forming the coil 20 may include only the first outer conductive layer 21 or only the second outer conductive layer 22 of the first and second outer conductive layers 21 and 22 or include both of the first and second outer conductive layers 21 and 22. Alternatively, the conductive layers forming the coil 20 may include neither of the first outer conductive layer 21 nor the second outer conductive layer 22.

If at least one of the first and second outer conductive layers 21 and 22 does not form the coil 20, this outer conductive layer may form a dummy coil, which is different from the coil 20. If at least one of the first and second outer conductive layers 21 and 22 does not form the coil 20, an inner conductive layer (inner conductive layer 23*a*, for example) may be electrically connected to the corresponding outer electrode in the direction along the inner conductive layer.

EXAMPLES

Specific examples of a multilayer coil component of an embodiment of the disclosure will be discussed below. However, the disclosure is not restricted to the following examples.

First Example

As a simulation model of a multilayer coil component according to a first example (hereinafter simply called the multilayer coil component of the first example), a multilayer coil component configured similarly to that of the multilayer coil component 1 shown in FIGS. 1 through 4, except for the arrangement of the void layer in the first outer interface, was used.

Figure 25:
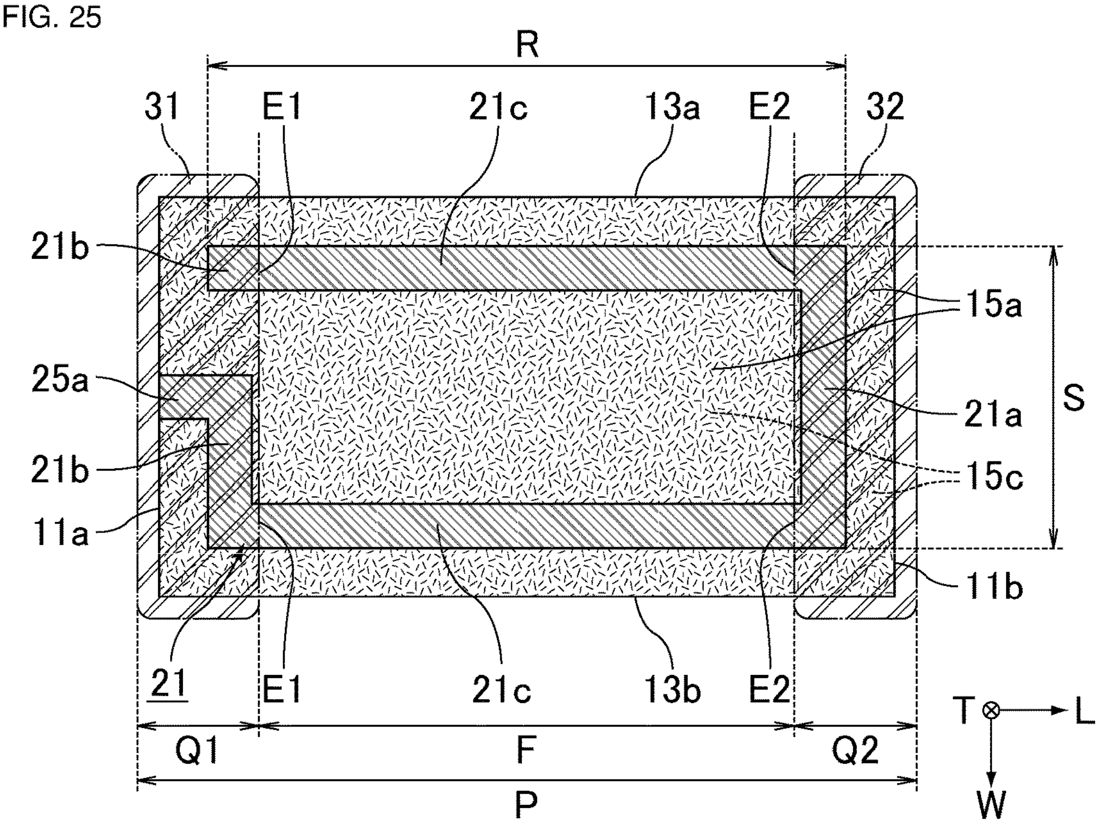
FIG. 25 is a schematic plan view illustrating a state of a multilayer coil component of a first example as seen through from the first main surface of the base body.

FIG. 25 is a schematic plan view illustrating a state of the multilayer coil component of the first example as seen through from the first main surface of the base body.

As illustrated in FIG. 25, in the multilayer coil component of the first example, the void layer is not provided in the entirety of the first outer interface between the first outer conductive layer 21 and the insulating layer 15*a*.

The various dimensions and distances shown in FIG. 25 of the multilayer coil component 1 of the first example are as follows.

- Dimension P of the multilayer coil component in the length direction L: 2040 μm
- Distance Q1 between the outermost positions of the first outer electrode 31 in the length direction L: 450 μm
- Distance Q2 between the outermost positions of the second outer electrode 32 in the length direction L: 450 μm
- Distance R between the outermost positions of the first outer conductive layer 21 in the length direction L: 1640 μm
- Distance S between the outermost positions of the first outer conductive layer 21 in the width direction W: 1040 μm
- Dimension F of a region of the first outer interface which overlaps the third portion 21*c* of the first outer conductive layer 21 in the extending direction (length direction L in this example) of the third portion 21*c*: 1140 μm The dimensions of the multilayer coil component of the first example are as follows.

- Average thickness of the outer electrodes (average thickness in the length direction L or in the width direction W in this example): 30 μm
- Average width of the conductive layers (average width in the length direction L or in the width direction W in this example): 210 μm
- Average thickness of the void layers (average thickness in the height direction T in this example): 5 μm
- Average width of the void layers (average width in the length direction L or in the width direction W in this example): 210 μm

Second Example

As a simulation model of a multilayer coil component according to a second example (hereinafter simply called the multilayer coil component of the second example), a multilayer coil component configured similarly to the multilayer coil component of the first example, except for the arrangement of the void layer in the first outer interface, was used.

Figure 26:
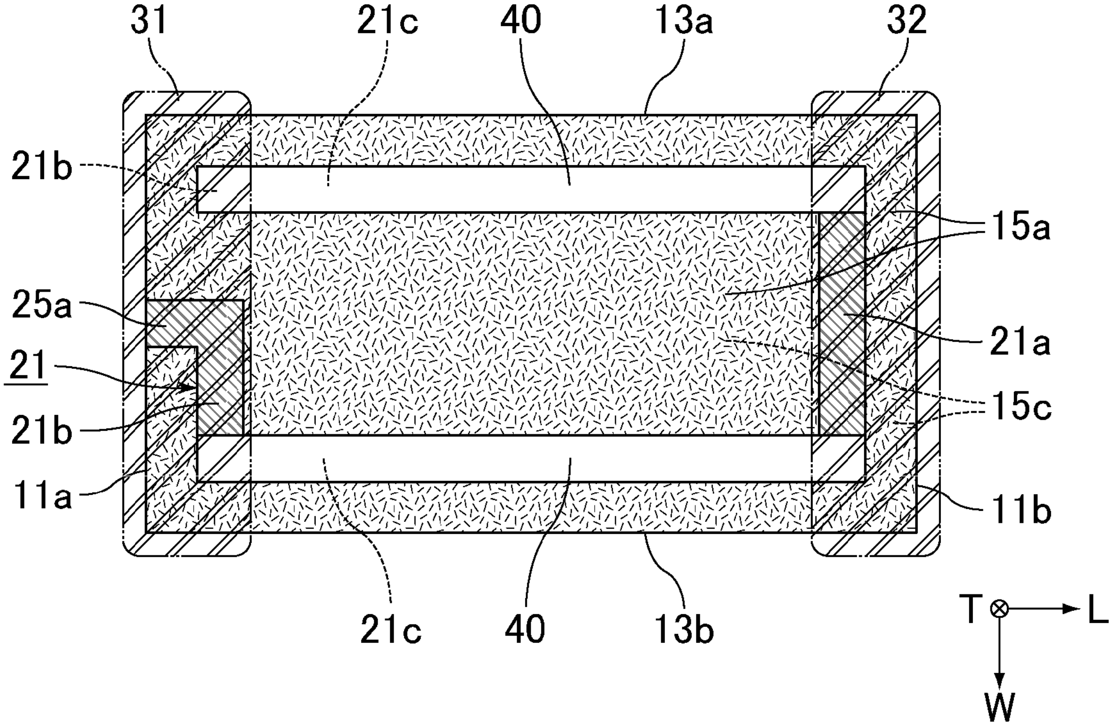
FIG. 26 is a schematic plan view illustrating a state of a multilayer coil component of a second example as seen through from the first main surface of the base body.

FIG. 26 is a schematic plan view illustrating a state of the multilayer coil component of the second example as seen through from the first main surface of the base body.

As illustrated in FIG. 26, in the multilayer coil component of the second example, in the first outer interface between the first outer conductive layer 21 and the insulating layer 15*a*, the void layer 40 is not provided in part of the region of the first outer interface which overlaps the first portion 21*a* of the first outer conductive layer 21 and in part of the region of the first outer interface which overlaps the second portion 21*b* of the first outer conductive layer 21. In other words, in the multilayer coil component of the second example, in the first outer interface between the first outer conductive layer 21 and the insulating layer 15*a*, the void layer 40 is provided in part of the region of the first outer interface which overlaps the first portion 21*a* of the first outer conductive layer 21, part of the region of the first outer interface which overlaps the second portion 21*b* of the first outer conductive layer 21, and the entirety of the region of the first outer interface which overlaps the third portion 21*c* of the first outer conductive layer 21.

Third Example

As a simulation model of a multilayer coil component according to a third example (hereinafter simply called the multilayer coil component of the third example), a multilayer coil component configured similarly to the multilayer coil component of the first example, except for the arrangement of the void layer in the first outer interface, was used.

Figure 27:
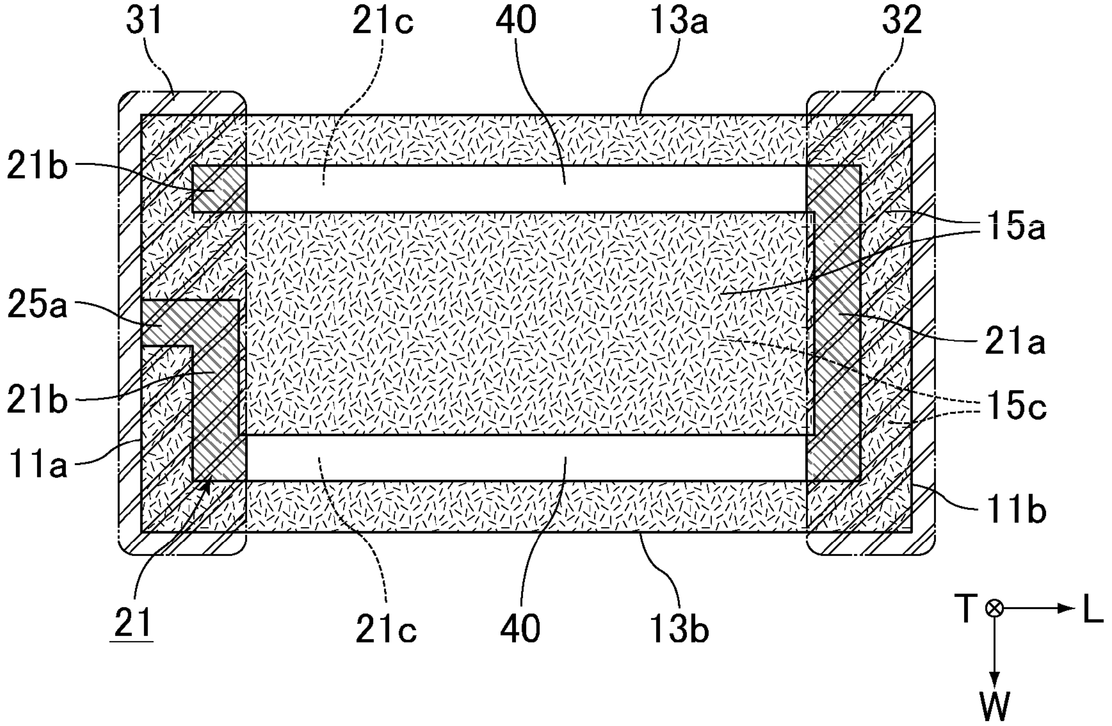
FIG. 27 is a schematic plan view illustrating a state of a multilayer coil component of a third example as seen through from the first main surface of the base body.

FIG. 27 is a schematic plan view illustrating a state of the multilayer coil component of the third example as seen through from the first main surface of the base body.

As illustrated in FIG. 27, in the multilayer coil component of the third example, in the first outer interface between the first outer conductive layer 21 and the insulating layer 15*a*, the void layer 40 is not provided in the entirety of the region of the first outer interface which overlaps the first portion 21*a* of the first outer conductive layer 21 and in the entirety of the region of the first outer interface which overlaps the second portion 21*b* of the first outer conductive layer 21. In other words, in the multilayer coil component of the third example, in the first outer interface between the first outer conductive layer 21 and the insulating layer 15*a*, the void layer 40 is provided in the entirety of the region of the first outer interface which overlaps the third portion 21*c* of the first outer conductive layer 21.

Fourth Example

As a simulation model of a multilayer coil component according to a fourth example (hereinafter simply called the multilayer coil component of the fourth example), a multilayer coil component configured similarly to the multilayer coil component of the first example, except for the arrangement of the void layer in the first outer interface, was used.

Figure 28:
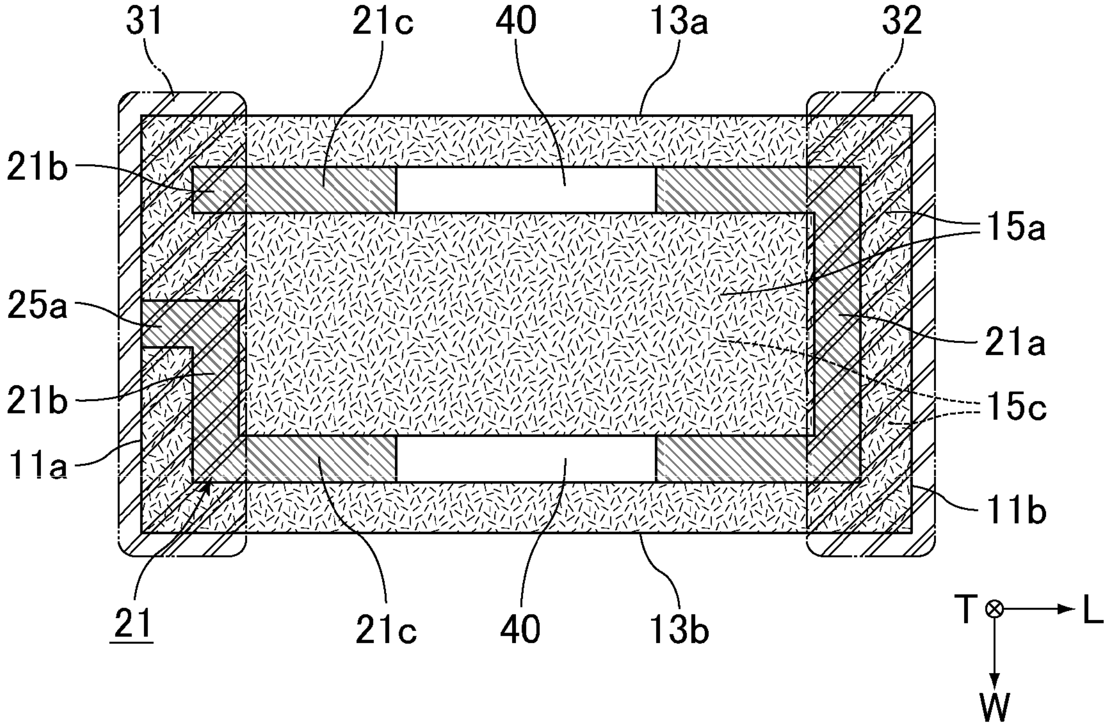
FIG. 28 is a schematic plan view illustrating a state of a multilayer coil component of a fourth example as seen through from the first main surface of the base body.

FIG. 28 is a schematic plan view illustrating a state of the multilayer coil component of the fourth example as seen through from the first main surface of the base body.

As illustrated in FIG. 28, in the multilayer coil component of the fourth example, in the first outer interface between the first outer conductive layer 21 and the insulating layer 15*a*, the void layer 40 is not provided in the entirety of the region of the first outer interface which overlaps the first portion 21*a* of the first outer conductive layer 21 and in the entirety of the region of the first outer interface which overlaps the second portion 21*b* of the first outer conductive layer 21. Additionally, the void layer 40 is not provided in at least part of the region of the first outer interface that overlaps the third portion 21*c* of the first outer conductive layer 21, and more specifically, the void layer 40 is not provided in the region of the first outer interface that overlaps the third portion 21*c* as viewed in the stacking direction (height direction T in this example), the region corresponding to 20% or more of the dimension from one end of the first outer electrode 31 to one end of the second outer electrode 32 in the extending direction of the third portion 21*c* of the first outer conductive layer 21. That is, in the multilayer coil component of the fourth example, in the first outer interface between the first outer conductive layer 21 and the insulating layer 15*a*, the void layer 40 is provided in part of the region of the first outer interface which overlaps the third portion 21*c* of the first outer conductive layer 21.

First Comparative Example

As a simulation model of a multilayer coil component according to a first comparative example (hereinafter simply called the multilayer coil component of the first comparative example), a multilayer coil component configured similarly to the multilayer coil component of the first example, except for the arrangement of the void layer in the first outer interface, was used.

Figure 29:
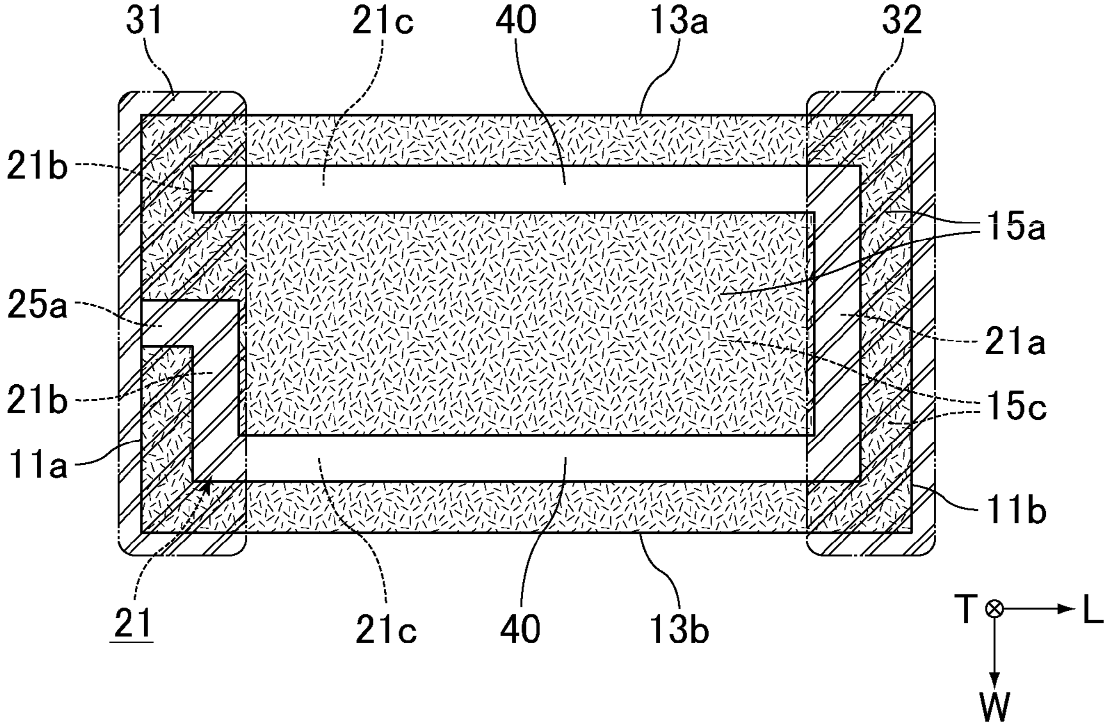
FIG. 29 is a schematic plan view illustrating a state of a multilayer coil component of a first comparative example as seen through from the first main surface of the base body.

FIG. 29 is a schematic plan view illustrating a state of the multilayer coil component of the first comparative example as seen through from the first main surface of the base body.

As illustrated in FIG. 29, in the multilayer coil component of the first comparative example, the void layer 40 is provided in the entirety of the first outer interface between the first outer conductive layer 21 and the insulating layer 15*a*.

Evaluation

Concerning each of the multilayer coil components of the first, second, third, and fourth examples and the multilayer coil component of the first comparative example, the tensile stress occurring in the insulating layer 15*a* in the vicinities of the first portion 21*a* and the second portion 21*b* of the first outer conductive layer 21 at the time of the mounting of the multilayer coil component was simulated with finite element analysis software "Femtet (registered trademark)" made by Murata Software Co., Ltd. In the simulations, the impact load (corresponding to the impact load D in FIG. 2) applied to the multilayer coil components in the stacking direction (height direction T in this example) at the time of the mounting of the multilayer coil components was set to 53 N.

The simulation results regarding the tensile stress in the multilayer coil components of the individual examples are shown in Table 1. In Table 1, the dimension of the void layer 40 (indicated as "dimension of void layer") of each of the multilayer coil components of the individual examples in the length direction L is also indicated.

TABLE 1

| | Dimension of void layer (μm) | Tensile stress (Mpa) |
|---|---|---|
| First example | 0 | 69.9 |
| Second example | 1640 | 165.6 |
| Third example | 1140 | 123.2 |
| Fourth example | 600 | 84.1 |
| First comparative example | 1640 | 240.5 |

Table 1 shows that the tensile stress occurring in the insulating layer 15*a* in the vicinities of the first portion 21*a* and the second portion 21*b* of the first outer conductive layer 21 in each of the multilayer coil components of the first through fourth examples is lower than that in the multilayer coil component of the first comparative example. Hence, the multilayer coil components of the first through fourth examples are more likely to reduce the occurrence of cracks in the insulating layer 15*a* in the vicinities of the first portion 21*a* and the second portion 21*b* of the first outer conductive layer 21 at the time of the mounting of the multilayer coil components than the multilayer coil component of the first comparative example.

Table 1 also shows that the tensile stress occurring the insulating layer 15*a* in the vicinities of the first portion 21*a* and the second portion 21*b* of the first outer conductive layer 21 becomes lower as the dimension of the void layer 40 in the length direction L becomes smaller in descending order of the multilayer coil components of the second, third, fourth, and first examples. From this result, the following assumptions are validated. In terms of reducing the tensile stress occurring in the insulating layer 15*a* in the vicinities of the first portion 21*a* and the second portion 21*b* of the first outer conductive layer 21, it is preferable that, in the first outer interface between the first outer conductive layer 21 and the insulating layer 15*a*, the void layer 40 be not provided in the entirety of the region of the first outer interface that overlaps the first portion 21*a* of the first outer conductive layer 21 and in the entirety of the region of the first outer interface that overlaps the second portion 21*b* of the first outer conductive layer 21, as in the multilayer coil components of the third and fourth examples. It is more preferable that the void layer 40 be not provided in the entirety of the first outer interface between the first outer conductive layer 21 and the insulating layer 15*a*, as in the multilayer coil component of the first example.

In the specification, the following aspects are disclosed.

<1> A multilayer coil component, comprising a base body constituted by a plurality of insulating layers stacked on each other in a stacking direction; a plurality of conductive layers that are disposed inside the base body and that are stacked on each other in the stacking direction together with the plurality of insulating layers; and a plurality of outer electrodes, each of the plurality of outer electrodes being disposed on a surface of the base body. The base body has first and second main surfaces opposing each other in the stacking direction. At least some of the plurality of conductive layers are electrically connected to each other so as to form a coil which is electrically connected to the plurality of outer electrodes. The plurality of conductive layers include first and second outer conductive layers and at least one inner conductive layer, the first outer conductive layer being disposed at an outermost position of the base body in the stacking direction on a side of the first main surface, the second outer conductive layer being disposed at an outermost position of the base body in the stacking direction on a side of the second main surface, and the at least one inner conductive layer being disposed between the first outer conductive layer and the second outer conductive layer in the stacking direction. The plurality of outer electrodes include first and second outer electrodes, the first outer electrode being disposed at least on the first main surface of the base body, the second outer electrode being disposed at least on the first main surface of the base body so as to separate from the first outer electrode, the second outer electrode not being electrically connected to the first outer conductive layer in a direction along the first outer conductive layer. Each of the at least one inner conductive layer forms a first inner interface with one of the plurality of insulating layers which is adjacent to a corresponding inner conductive layer in the stacking direction on the side of the first main surface of the base body and also forms a second inner interface with one of the plurality of insulating layers which is adjacent to the corresponding inner conductive layer in the stacking direction on the side of the second main surface of the base body. The first outer conductive layer forms a first outer interface with one of the plurality of insulating layers which is adjacent to the first outer conductive layer in the stacking direction on the side of the first main surface of the base body and also forms a second outer interface with one of the plurality of insulating layers which is adjacent to the first outer conductive layer in the stacking direction on the side of the second main surface of the base body. The first outer conductive layer includes a first portion, the first portion overlapping a portion of the second outer electrode disposed on the first main surface of the base body as viewed in the stacking direction. A void layer is provided in at least one inner interface of the first and second inner interfaces, and when the first portion of the first outer conductive layer is seen in cross sections along the stacking direction and a direction which is perpendicular to an extending direction of the first portion as viewed in the stacking direction, in at least one of the cross sections of the first portion, the void layer is provided neither in the first outer interface nor in the second outer interface.

<2> The multilayer coil component according to <1>, wherein the first outer electrode is electrically connected to the first outer conductive layer in the direction along the first outer conductive layer.

<3> The multilayer coil component according to <1> or <2>, wherein the first outer electrode is not electrically connected to the second outer conductive layer in a direction along the second outer conductive layer.

<4> The multilayer coil component according to one of <1> to <3>, wherein the second outer electrode is electrically connected to the second outer conductive layer in a direction along the second outer conductive layer.

<5> The multilayer coil component according to one of <1> to <4>, wherein the first main surface of the base body is a mounting surface which faces a subject device to mount the multilayer coil component thereon at a time of mounting of the multilayer coil component.

<6> The multilayer coil component according to one of <1> to <5>, wherein the void layer is not provided in entirety of a region of each of the first and second outer interfaces, the region overlapping the first portion of the first outer conductive layer as viewed in the stacking direction.

<7> The multilayer coil component according to one of <1> to <6>, wherein the first outer conductive layer includes a second portion, the second portion overlapping a portion of the first outer electrode disposed on the first main surface of the base body as viewed in the stacking direction; and the void layer is not provided in at least part of a region of each of the first and second outer interfaces, the region overlapping the second portion of the first outer conductive layer as viewed in the stacking direction.

<8> The multilayer coil component according to <7>, wherein the void layer is not provided in entirety of the region of each of the first and second outer interfaces, the region overlapping the second portion of the first outer conductive layer as viewed in the stacking direction.

<9> The multilayer coil component according to one of <1> to <8>, wherein the first outer conductive layer includes the first portion, a second portion, and a third portion, the second portion overlapping a portion of the first outer electrode disposed on the first main surface of the base body as viewed in the stacking direction, the third portion being a portion other than the first portion and the second portion. Also, the void layer is not provided in entirety of a first region of each of the first and second outer interfaces, the first region overlapping the first portion of the first outer conductive layer as viewed in the stacking direction, the void layer is not provided in entirety of a second region of each of the first and second outer interfaces, the second region overlapping the second portion of the first outer conductive layer as viewed in the stacking direction, and the void layer is not provided in at least part of a third region of each of the first and second outer interfaces, the third region overlapping the third portion of the first outer conductive layer as viewed in the stacking direction, the at least part of the third region corresponding to 20% or more of a dimension from one end of the first outer electrode to one end of the second outer electrode in an extending direction of the third portion.

<10> The multilayer coil component according to one of <1> to <9>, wherein the void layer is provided neither in entirety of the first outer interface nor in entirety of the second outer interface.

<11> The multilayer coil component according to one of <1> to <10>, wherein a ratio of an area of the void layer to an area of the first outer conductive layer in each of the first and second outer interfaces is lower than a ratio of an area of the void layer to an area of the at least one inner conductive layer in at least one inner interface of the first and second inner interfaces.

<12> The multilayer coil component according to one of <1> to <11>, wherein each of the first and second outer electrodes is disposed on the second main surface of the base body in addition to the first main surface of the base body.

<13> The multilayer coil component according to <12>, wherein the second outer conductive layer forms a third outer interface with one of the plurality of insulating layers which is adjacent to the second outer conductive layer in the stacking direction on the side of the first main surface and also forms a fourth outer interface with one of the plurality of insulating layers which is adjacent to the second outer conductive layer in the stacking direction on the side of the second main surface. Also, the second outer conductive layer includes a first portion, the first portion overlapping a portion of the first outer electrode disposed on the second main surface of the base body as viewed in the stacking direction; and the void layer is not provided in at least part of a region of each of the third and fourth outer interfaces, the region overlapping the first portion of the second outer conductive layer as viewed in the stacking direction.

<14> The multilayer coil component according to <13>, wherein the void layer is not provided in entirety of the region of each of the third and fourth outer interfaces, the region overlapping the first portion of the second outer conductive layer as viewed in the stacking direction.

<15> The multilayer coil component according to <13> or <14>, wherein the second outer conductive layer includes a second portion, the second portion overlapping a portion of the second outer electrode disposed on the second main surface of the base body as viewed in the stacking direction; and the void layer is not provided in at least part of a region of each of the third and fourth outer interfaces, the region overlapping the second portion of the second outer conductive layer as viewed in the stacking direction.

<16> The multilayer coil component according to <15>, wherein the void layer is not provided in entirety of the region of each of the third and fourth outer interfaces, the region overlapping the second portion of the second outer conductive layer as viewed in the stacking direction.

<17> The multilayer coil component according to one of <13> to <16>, wherein the second outer conductive layer includes the first portion, a second portion, and a third portion, the second portion overlapping a portion of the second outer electrode disposed on the second main surface of the base body as viewed in the stacking direction, the third portion being a portion other than the first portion and the second portion. Also, the void layer is not provided in entirety of a first region of each of the third and fourth outer interfaces, the first region overlapping the first portion of the second outer conductive layer as viewed in the stacking direction, the void layer is not provided in entirety of a second region of each of the third and fourth outer interfaces, the second region overlapping the second portion of the second outer conductive layer as viewed in the stacking direction, and the void layer is not provided in at least part of a third region of each of the third and fourth outer interfaces, the third region overlapping the third portion of the second outer conductive layer as viewed in the stacking direction, the at least part of the third region corresponding to 20% or more of a dimension from one end of the first outer electrode to one end of the second outer electrode in an extending direction of the third portion.

<18> The multilayer coil component according to one of <13> to <17>, wherein the void layer is provided neither in entirety of the third outer interface nor in entirety of the fourth outer interface.

<19> The multilayer coil component according to one of <13> to <18>, wherein a ratio of an area of the void layer to an area of the second outer conductive layer in each of the third and fourth outer interfaces is lower than a ratio of an area of the void layer to an area of the at least one inner conductive layer in at least one inner interface of the first and second inner interfaces.

<20> The multilayer coil component according to one of <1> to <19>, wherein the void layer is provided in at least part of each of the first and second inner interfaces.

<21> The multilayer coil component according to <20>, wherein the void layer is provided in entirety of at least one of the first and second inner interfaces of each of the at least one inner conductive layer.

<22> The multilayer coil component according to <21>, wherein the void layer is provided in entirety of one of the first and second inner interfaces of each of the at least one inner conductive layer.

<23> The multilayer coil component according to <21>, wherein the void layer is provided in entirety of both of the first and second inner interfaces of each of the at least one inner conductive layer.

What is claimed is:

1. A multilayer coil component, comprising:

a base body including a plurality of insulating layers stacked on each other in a stacking direction;

a plurality of conductive layers that are inside the base body and that are stacked on each other in the stacking direction together with the plurality of insulating layers; and a plurality of outer electrodes, each of the plurality of outer electrodes being on a surface of the base body, wherein the base body has first and second main surfaces opposing each other in the stacking direction, at least some of the plurality of conductive layers are electrically connected to each other to configure a coil which is electrically connected to the plurality of outer electrodes, the plurality of conductive layers include first and second outer conductive layers and at least one inner conductive layer, the first outer conductive layer being at an outermost position of the base body in the stacking direction on a side of the first main surface, the second outer conductive layer being at an outermost position of the base body in the stacking direction on a side of the second main surface, the at least one inner conductive layer being between the first outer conductive layer and the second outer conductive layer in the stacking direction, the plurality of outer electrodes include first and second outer electrodes, the first outer electrode being at least on the first main surface of the base body, the second outer electrode being at least on the first main surface of the base body so as to separate from the first outer electrode, the second outer electrode not being electrically connected to the first outer conductive layer in a direction along the first outer conductive layer, each of the at least one inner conductive layer configures a first inner interface with one of the plurality of insulating layers which is adjacent to a corresponding inner conductive layer in the stacking direction on the side of the first main surface of the base body and also configures a second inner interface with one of the plurality of insulating layers which is adjacent to the corresponding inner conductive layer in the stacking direction on the side of the second main surface of the base body, the first outer conductive layer configures a first outer interface with one of the plurality of insulating layers which is adjacent to the first outer conductive layer in the stacking direction on the side of the first main surface of the base body and also configures a second outer interface with one of the plurality of insulating layers which is adjacent to the first outer conductive layer in the stacking direction on the side of the second main surface of the base body, the first outer conductive layer includes a first portion, the first portion overlapping a portion of the second outer electrode on the first main surface of the base body as viewed in the stacking direction, a void layer is in at least one inner interface of the first and second inner interfaces, and when the first portion of the first outer conductive layer is seen in cross sections along the stacking direction and a direction which is perpendicular to an extending direction of the first portion as viewed in the stacking direction, in at least one of the cross sections of the first portion, the void layer is neither in the first outer interface nor in the second outer interface.

2. The multilayer coil component according to claim 1, wherein the first outer electrode is electrically connected to the first outer conductive layer in the direction along the first outer conductive layer.

3. The multilayer coil component according to claim 1, wherein the first outer electrode is not electrically connected to the second outer conductive layer in a direction along the second outer conductive layer.

4. The multilayer coil component according to claim 1, wherein the second outer electrode is electrically connected to the second outer conductive layer in a direction along the second outer conductive layer.

5. The multilayer coil component according to claim 1, wherein the first main surface of the base body is a mounting surface which faces a subject device to mount the multilayer coil component thereon at a time of mounting of the multilayer coil component.

6. The multilayer coil component according to claim 1, wherein the void layer is not in entirety of a region of each of the first and second outer interfaces, the region overlapping the first portion of the first outer conductive layer as viewed in the stacking direction.

7. The multilayer coil component according to claim 1, wherein the first outer conductive layer includes a second portion, the second portion overlapping a portion of the first outer electrode on the first main surface of the base body as viewed in the stacking direction; and the void layer is not in at least part of a region of each of the first and second outer interfaces, the region overlapping the second portion of the first outer conductive layer as viewed in the stacking direction.

8. The multilayer coil component according to claim 7, wherein the void layer is not in entirety of the region of each of the first and second outer interfaces, the region overlapping the second portion of the first outer conductive layer as viewed in the stacking direction.

9. The multilayer coil component according to claim 1, wherein the first outer conductive layer includes the first portion, a second portion, and a third portion, the second portion overlapping a portion of the first outer electrode on the first main surface of the base body as viewed in the stacking direction, the third portion being a portion other than the first portion and the second portion; and the void layer is not in entirety of a first region of each of the first and second outer interfaces, the first region overlapping the first portion of the first outer conductive layer as viewed in the stacking direction, the void layer is not in entirety of a second region of each of the first and second outer interfaces, the second region overlapping the second portion of the first outer conductive layer as viewed in the stacking direction, and the void layer is not in at least part of a third region of each of the first and second outer interfaces, the third region overlapping the third portion of the first outer conductive layer as viewed in the stacking direction, the at least part of the third region corresponding to 20% or more of a dimension from one end of the first outer electrode to one end of the second outer electrode in an extending direction of the third portion.

10. The multilayer coil component according to claim 1, wherein the void layer is neither in entirety of the first outer interface nor in entirety of the second outer interface.

11. The multilayer coil component according to claim 1, wherein a ratio of an area of the void layer to an area of the first outer conductive layer in each of the first and second outer interfaces is lower than a ratio of an area of the void layer to an area of the at least one inner conductive layer in at least one inner interface of the first and second inner interfaces.

12. The multilayer coil component according to claim 1, wherein each of the first and second outer electrodes is on the second main surface of the base body in addition to the first main surface of the base body.

13. The multilayer coil component according to claim 12, wherein the second outer conductive layer configures a third outer interface with one of the plurality of insulating layers which is adjacent to the second outer conductive layer in the stacking direction on the side of the first main surface and also configures a fourth outer interface with one of the plurality of insulating layers which is adjacent to the second outer conductive layer in the stacking direction on the side of the second main surface;

the second outer conductive layer includes a first portion, the first portion overlapping a portion of the first outer electrode on the second main surface of the base body as viewed in the stacking direction; and the void layer is not in at least part of a region of each of the third and fourth outer interfaces, the region overlapping the first portion of the second outer conductive layer as viewed in the stacking direction.

14. The multilayer coil component according to claim 13, wherein the void layer is not in entirety of the region of each of the third and fourth outer interfaces, the region overlapping the first portion of the second outer conductive layer as viewed in the stacking direction.

15. The multilayer coil component according to claim 13, wherein the second outer conductive layer includes a second portion, the second portion overlapping a portion of the second outer electrode on the second main surface of the base body as viewed in the stacking direction; and the void layer is not in at least part of a region of each of the third and fourth outer interfaces, the region overlapping the second portion of the second outer conductive layer as viewed in the stacking direction.

16. The multilayer coil component according to claim 15, wherein the void layer is not in entirety of the region of each of the third and fourth outer interfaces, the region overlapping the second portion of the second outer conductive layer as viewed in the stacking direction.

17. The multilayer coil component according to claim 13, wherein the second outer conductive layer includes the first portion, a second portion, and a third portion, the second portion overlapping a portion of the second outer electrode on the second main surface of the base body as viewed in the stacking direction, the third portion being a portion other than the first portion and the second portion; and the void layer is not in entirety of a first region of each of the third and fourth outer interfaces, the first region overlapping the first portion of the second outer conductive layer as viewed in the stacking direction, the void layer is not in entirety of a second region of each of the third and fourth outer interfaces, the second region overlapping the second portion of the second outer conductive layer as viewed in the stacking direction, and the void layer is not in at least part of a third region of each of the third and fourth outer interfaces, the third region overlapping the third portion of the second outer conductive layer as viewed in the stacking direction, the at least part of the third region corresponding to 20% or more of a dimension from one end of the first outer electrode to one end of the second outer electrode in an extending direction of the third portion.

18. The multilayer coil component according to claim 13, wherein the void layer is neither in entirety of the third outer interface nor in entirety of the fourth outer interface.

19. The multilayer coil component according to claim 13, wherein a ratio of an area of the void layer to an area of the second outer conductive layer in each of the third and fourth outer interfaces is lower than a ratio of an area of the void layer to an area of the at least one inner conductive layer in at least one inner interface of the first and second inner interfaces.

20. The multilayer coil component according to claim 1, wherein the void layer is in at least part of each of the first and second inner interfaces.

21. The multilayer coil component according to claim 20, wherein the void layer is in entirety of at least one of the first and second inner interfaces of each of the at least one inner conductive layer.

22. The multilayer coil component according to claim 21, wherein the void layer is in entirety of one of the first and second inner interfaces of each of the at least one inner conductive layer.

23. The multilayer coil component according to claim 21, wherein the void layer is in entirety of both of the first and second inner interfaces of each of the at least one inner conductive layer.

* * * * *